United States Patent
Beech, Jr. et al.

(10) Patent No.: US 8,097,216 B2
(45) Date of Patent: *Jan. 17, 2012

(54) FLUIDIZING A POPULATION OF CATALYST PARTICLES HAVING A LOW CATALYST FINES CONTENT

(75) Inventors: James H. Beech, Jr., Kingwood, TX (US); Nicolas P. Coute, Houston, TX (US); Jeffrey S. Smith, Texas City, TX (US); Michael Peter Nicoletti, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,069

(22) Filed: Oct. 5, 2010

(65) Prior Publication Data

US 2011/0020186 A1 Jan. 27, 2011

Related U.S. Application Data

(62) Division of application No. 11/143,390, filed on Jun. 2, 2005, now Pat. No. 7,829,030.

(60) Provisional application No. 60/640,615, filed on Dec. 30, 2004.

(51) Int. Cl.
*B01J 8/18* (2006.01)
*F27B 15/08* (2006.01)

(52) U.S. Cl. ................ 422/139; 422/143; 422/144

(58) Field of Classification Search ........... 422/139, 422/143, 144
See application file for complete search history.

(56) References Cited

U.S. PATENT DOCUMENTS

| | | | |
|---|---|---|---|
| 2,420,542 A | 5/1947 | Jahning |
| 2,573,559 A | 10/1951 | Friedman |
| 2,579,834 A | 12/1951 | Kollgaard |
| 3,293,171 A | 12/1966 | Metrailer |
| 3,819,679 A | 6/1974 | Sheely |
| 4,138,219 A | 2/1979 | Colvert et al. |
| 4,385,985 A | 5/1983 | Gross et al. |

(Continued)

FOREIGN PATENT DOCUMENTS

EP 0 359 843 12/1992

(Continued)

OTHER PUBLICATIONS

Socha et al., "Fluid-Bed Studies of Olefin Production from Methanol," Olefin Production From Methanol, Chapter 3, pp. 35-41, published 1987; "Socha".

(Continued)

*Primary Examiner* — Nina Bhat
(74) *Attorney, Agent, or Firm* — Kevin M. Faulkner

(57) ABSTRACT

A process and apparatus for fluidizing a population of catalyst particles having a low catalyst fines content includes a fluidized bed reactor which includes a plurality of catalyst particles in the reactor wherein the catalyst particles having a $d_2$ value of greater than about 40 microns. The catalyst particles are contacted with a fluidizing medium under conditions to fluidize the particles, the reactor includes a continuous reaction zone and separation zone and the fluidized of the catalyst particles are situated within the reaction and both the reaction zone and the separation zone include obstructing members which obstruct the flow of particles such that the catalyst particles can be maintained at an axial gas Peclet number from about 10 to about 20.

21 Claims, 8 Drawing Sheets

U.S. PATENT DOCUMENTS

| | | | |
|---|---|---|---|
| 4,435,282 A | | 3/1984 | Bertolacini et al. |
| 4,493,735 A | | 1/1985 | Flaschel et al. |
| 4,738,829 A | * | 4/1988 | Krug .......................... 422/144 |
| 4,858,144 A | | 8/1989 | Marsaly et al. |
| 4,959,334 A | | 9/1990 | Mauleon et al. |
| 4,968,404 A | | 11/1990 | Chan et al. |
| 5,273,720 A | * | 12/1993 | Zinke .......................... 422/144 |
| 5,435,972 A | | 7/1995 | Daw et al. |
| 5,746,321 A | | 5/1998 | Hettinger, Jr. et al. |
| 6,023,005 A | | 2/2000 | Lattner et al. |
| 6,166,282 A | | 12/2000 | Miller |
| 6,245,703 B1 | | 6/2001 | Kuechler et al. |
| 6,301,546 B1 | | 10/2001 | Weinstein et al. |
| 6,403,854 B1 | | 6/2002 | Miller et al. |
| 6,673,978 B2 | * | 1/2004 | Coute' et al. ................. 585/634 |
| 7,199,278 B2 | * | 4/2007 | Fung et al. .................... 585/640 |
| 7,214,636 B2 | * | 5/2007 | Beech et al. ..................... 502/38 |
| 7,744,746 B2 | * | 6/2010 | Cunningham et al. ........ 208/121 |
| 7,914,610 B2 | * | 3/2011 | Mehlberg ......................... 95/271 |
| 7,972,565 B2 | * | 7/2011 | Lambin et al. ................ 422/144 |
| 2002/0013505 A1 | | 1/2002 | Fung et al. |
| 2003/0004384 A1 | | 1/2003 | Coute et al. |
| 2003/0055183 A1 | | 3/2003 | Williams et al. |
| 2003/0125598 A1 | | 7/2003 | Chisholm et al. |
| 2003/0194356 A1 | | 10/2003 | Meier et al. |
| 2003/0199721 A1 | | 10/2003 | Ding et al. |
| 2003/0199724 A1 | | 10/2003 | Van Egmond et al. |
| 2004/0064007 A1 | | 4/2004 | Beech et al. |
| 2004/0076554 A1 | | 4/2004 | Kuechler et al. |
| 2005/0043577 A1 | | 2/2005 | Beech, Jr. et al. |
| 2005/0245781 A1 | | 11/2005 | Martens et al. |
| 2006/0270884 A1 | * | 11/2006 | Beech et al. .................. 585/639 |

FOREIGN PATENT DOCUMENTS

| | | | |
|---|---|---|---|
| EP | 0 610 186 | | 8/1994 |
| EP | 1 036 838 | | 9/2000 |
| EP | 1036838 | * | 9/2000 |
| GB | 769818 | | 3/1957 |
| GB | 849929 | | 9/1960 |
| GB | 1562571 | | 3/1980 |
| WO | 99/55799 | | 4/1999 |
| WO | 00/41986 | | 7/2000 |
| WO | 02/08359 | | 1/2002 |
| WO | 2004/018092 | | 3/2004 |

OTHER PUBLICATIONS

Briens et al., "Reduction of Particle Entrainment from Gas-Fluidized Beds. Prediction of the Effect of Disengagement Zones," Powder Technology, 62: pp. 135-138, published 1990; "Briens".

Kale et al., "An Experimental Investigation of Gas-Particle Flows through Diffusers in the Freeboard Region of Fluidized Beds," Int J Multiphase Flow, 11(5): pp. 659-674, published 1985; "Kale".

Khouw et al., "The Shell Residue Fluid Catalytic Cracking Process Commercial Experience and Future Developments," National Petroleum Refiners Association, 1990 Annual Meeting, published Mar. 25-27, 1990; "Khouw".

http://www refiningonline.com/engelhardkb/crep/tcrl_2.htm How Catalyst Characteristics Affect Circulation, pp. 1-9.

Valverde, J.M., et al., "*Effect of Particle Size and Interparticle Force on the Fluidization Behavior of Gas-Fluidized Beds*," The American Physical Society, Physical Review E 67, pp. 1-6, 2003.

Ramakers, B.J., et al., "*Fluidization Behavior of Wood/Sand Mixtures*," vol. B, pp. 1337-1344, 2004.

Kobayashi, T., Kawaguchi, T., Tanaka, T. and Tsuji, Y., "DEM Analysis on Flow Patterns of Geldart's Group A Particles in Fluidized Bed ", Proc. of World Congress on Particle Technology 4 (CD-ROM), Jul. 21-25, Sydney, Australia, (2002), Paper No. 178, pp. 1-8.

\* cited by examiner

US 8,097,216 B2

FLUIDIZING A POPULATION OF CATALYST PARTICLES HAVING A LOW CATALYST FINES CONTENT

CROSS REFERENCE TO RELATED APPLICATIONS

This application is a Divisional of, and claims priority to, U.S. Ser. No. 11/143,390 filed Jun. 2, 2005, U.S. Pat. No. 7,829,030 and Provisional Application No. U.S. Ser. No. 60/640,615 filed Dec. 30, 2004. This application is related to U.S. Ser. No. 11/293,584, filed Dec. 2, 2005, U.S. Pat. No. 7,829,750 which is a continuation in-part of U.S. Ser. No. 11/143,390, filed Jun. 2, 2005. All of the above disclosures are fully incorporated herein by reference.

FIELD OF THE INVENTION

The present invention relates to processes for fluidizing catalyst particles, and more particularly to fluidizing a population of catalyst particles having a low catalyst fines content.

BACKGROUND OF THE INVENTION

Light olefins, defined herein as ethylene and propylene, serve as feeds for the production of numerous chemicals. Olefins traditionally are produced by petroleum cracking. Because of the limited supply and/or the high cost of petroleum sources, the cost of producing olefins from petroleum sources has increased steadily.

Various oxygenates, such as alcohols, particularly methanol, dimethyl ether, and ethanol, are alternative feedstocks for the production of light olefins. Alcohols may be produced by fermentation, or from synthesis gas derived from natural gas, petroleum liquids, carbonaceous materials, including coal, recycled plastics, municipal wastes, or any organic material. Because of the wide variety of sources, alcohol, alcohol derivatives, and other oxygenates have promise as an economical, non-petroleum source for olefin production.

In an oxygenate to olefin (OTO) reaction system, an oxygenate in an oxygenate-containing feedstock contacts a molecular sieve catalyst composition under conditions effective to convert at least a portion of the oxygenate to light olefins, which are yielded from the reaction system in a reaction effluent. As the feedstock contacts the molecular sieve catalyst compositions at high weight hourly space velocities and under elevated temperature and pressure conditions, a portion of the catalyst compositions can break up, e.g., attrit, to form one or more smaller attrited catalyst particles. Some catalyst attrition particles are very small in size and are referred to as catalyst fines. Due to their relatively high surface area to mass ratios, a portion of the catalyst fines in the reaction system may become entrained with the reaction effluent and exit the reaction system therewith. Conversely, due to their relatively low surface area to mass ratios, larger particles tend to be selectively retained in OTO reaction systems. The selective retention of larger particles is particularly a problem for highly attrition resistant particles.

Additional catalyst particles, particularly catalyst fines, may be lost from a catalyst regenerator associated with the OTO reaction system. In conventional regeneration vessels, coked catalyst is directed from a reactor to a catalyst regenerator. In a catalyst regenerator, the catalyst is fluidized with a fluidizing medium, typically comprising the regeneration medium, under conditions effective to remove the coke from the coked catalyst by combustion with the regeneration medium and form regenerated catalyst and gaseous byproducts. The bulk of the regenerated catalyst from the regenerator is returned to the reactor. The gaseous byproducts are forced out an exhaust outlet oriented in the upper section of the catalyst regenerator. Undesirably, a significant amount of entrained catalyst from the regenerator, particularly catalyst fines, is forced out the exhaust outlet with the gaseous byproducts.

One undesirable effect caused by the build up of large catalyst particles in an OTO reaction or regeneration system is that in a large particle rich reaction or regeneration system, the circulating fluid bed or fluidized bed will not operate as well due to the loss of the fine particles, particularly with regard to circulation of catalyst within the standpipes and also with regard to gas distribution within the fluidized bed. Several processes have been disclosed that address this problem.

One conventional technique, for example, includes non-selectively removing a fraction of all of the catalyst particles in the reaction system to make room for the addition of fresh catalyst. This technique for removing undesirably-sized catalyst particles is inefficient, however, because a significant portion of the desirably-sized catalyst particles are removed from the reaction system with the undesirably-sized catalyst particles.

U.S. Pat. No. 5,746,321 to Hettinger, Jr. et al. discloses the combination of a magnetic separator, a catalyst classifier, and/or a catalyst attriter, which wears off the outer layers of catalyst, yields more active catalyst of lower metal content with closer control of average particles size, and narrows particle size distribution providing improved fluidization properties and better activity and selectivity. The process is especially useful when processing high metal-containing feedstocks.

U.S. Pat. No. 2,573,559 to Friedman discloses replacing a bed of fluidized catalyst, which has become reduced in activity during use, with fresh fluidized catalyst, the average particle size of both catalysts being in the range of 40-400 mesh. The average size of the fresh catalyst differs from that of the partially spent catalyst by at least 10-mesh size and preferably 25 mesh. The fresh catalyst is introduced into the reactor under conditions such that the reaction temperature is not substantially increased, and at the same time catalyst is withdrawn from the reactor at a portion below the top level of the bed. The catalyst withdrawn is separated by particle size into fresh catalyst, which is returned to the reactor, and deactivated catalyst, which is regenerated. According to the '559 patent, the complete replacement of catalyst can be accomplished under normal operating conditions in from 20 to 48 hours.

U.S. patent application Ser. No. 10/835,494, filed on Apr. 29, 2004, discloses processes for maintaining a desired particle size distribution in an OTO reaction system. In one embodiment, the invention comprises replacing lost catalyst fines with less active co-catalyst particles. By adding less active co-catalyst particles to the reaction system, desirable fluidization characteristics and hydrodynamics can be maintained without affecting the overall performance and product selectivities.

The need remains, however, for improving the fluidization characteristics of a population of catalyst particles that is depleted of catalyst fines, e.g., has a high particle size distribution or median particle diameter, without necessitating the addition of new catalyst fines.

SUMMARY OF THE INVENTION

This invention provides novel processes for efficiently fluidizing a population of catalyst particles having a low catalyst fines content in a fluidized bed reactor. The population of catalyst particles is fluidized in the fluidized bed reactor to form a fluidized bed. In the fluidized bed, the population of catalyst particles contacts one or more obstructing members, e.g., baffles, under fluidization conditions. The present invention is particularly well-suited for fluidizing a population of catalyst particles depleted of catalyst fines in an oxygenate to olefins (OTO) reactor and/or catalyst regenerator.

In one embodiment, the invention is to a process for fluidizing catalyst particles in a reactor, wherein the process comprises the step of: (a) providing a plurality of catalyst particles in the reactor, wherein the catalyst particles have a $d_2$ value of greater than about 40, greater than about 50 or greater than about 60 microns; (b) contacting the catalyst particles with a fluidizing medium under conditions effective to cause the catalyst particles to behave in a fluidized manner and form a fluidized bed; and (c) contacting the particles with one or more primary obstructing members while in the fluidized bed.

Optionally, the process further comprises the step of: contacting a feedstock comprising an oxygenate with the plurality of catalyst particles under conditions effective to convert the oxygenate to light olefins and water. In this aspect, the fluidizing medium optionally comprises the feedstock.

Alternatively, at least a portion of the plurality of catalyst particles are at least partially coked, and the process further comprising the step of: contacting a regeneration medium with the plurality of catalyst particles under conditions effective to at least partially regenerate the at least partially coked catalyst particles. In this aspect, the regeneration medium optionally comprises air, and the fluidizing medium optionally comprises the regeneration medium.

In another embodiment, the invention is to a plurality of fluidized catalyst particles in a fluidized bed having a $d_2$ value of greater than 40, greater than about 50 or greater than about 60 microns and having an axial gas Peclet number of from about 4 to about 100 when the particles are fluidized in a reactor having one or more primary obstructing members situated within the fluidized bed.

In another embodiment, the invention is to a reaction system, comprising: (a) a fluidized bed of a plurality of catalyst particles in a reactor, wherein the catalyst particles have a $d_2$ value of greater than about 40, greater than about 50, or greater than about 60 microns; and (b) one or more primary obstructing members situated within the fluidized bed for at least partially obstructing the upward flow of the catalyst particles.

Optionally, the reactor comprises a reaction zone and a separation zone, and the fluidized bed is situated within the reaction zone. In this aspect of the invention, one or more secondary obstructing members optionally are situated within the separation zone for at least partially obstructing the upward flow of entrained catalyst. Optionally, the one or more secondary obstructing members are situated less than 2 meters above the fluidized bed. The reactor optionally comprises a catalyst regenerator or an oxygenate to olefin reactor.

Optionally, the catalyst particles in the fluidized bed, e.g., the fluidized catalyst particles, have an axial gas Peclet number of from about 4 to about 100, preferably from about 8 to about 30, and most preferably from about 10 to about 20.

Optionally, the catalyst particles comprise molecular sieves selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AEI/CHA intergrowths, the metal containing forms thereof, and mixtures thereof. The catalyst particles optionally contact a feedstock comprising an oxygenate in the fluidized bed under conditions effective to convert the oxygenate to light olefins and water. In this aspect, the catalyst particles optionally are fluidized with a fluidizing medium comprising the feedstock.

Alternatively, the reactor comprises a catalyst regenerator. In this embodiment, at least a portion of the plurality of catalyst particles are at least partially coked. In this aspect, the catalyst particles optionally contact a regeneration medium, preferably comprising air, in the fluidized bed under conditions effective to at least partially regenerate the at least partially coked catalyst particles. Optionally, the catalyst particles are fluidized with a fluidizing medium comprising the regeneration medium.

Optionally, the one or more primary obstructing members comprise at least one inverted "V" shaped baffle, which covers a portion of the total lateral cross sectional area of the fluidized bed. The inverted "V" shaped baffle optionally covers from about 20 to about 80 percent, from about 40 to about 60 percent, or from about 45 to about 55 percent of the total lateral cross sectional area of the fluidized bed. Additionally or alternatively, the one or more primary obstructing members comprise at least one subway grate style baffle, which covers a portion of the total lateral cross sectional area of the fluidized bed. The subway grate style baffle optionally covers from about 60 to about 95 percent, from about 70 to about 95 percent or from about 80 to about 90 percent of the total lateral cross sectional area of the fluidized bed.

BRIEF DESCRIPTION OF THE DRAWINGS

This invention will be better understood by reference to the Detailed Description of the Invention when taken together with the attached drawings, wherein.

DETAILED DESCRIPTION OF THE INVENTION

I. Introduction

Figure 1:
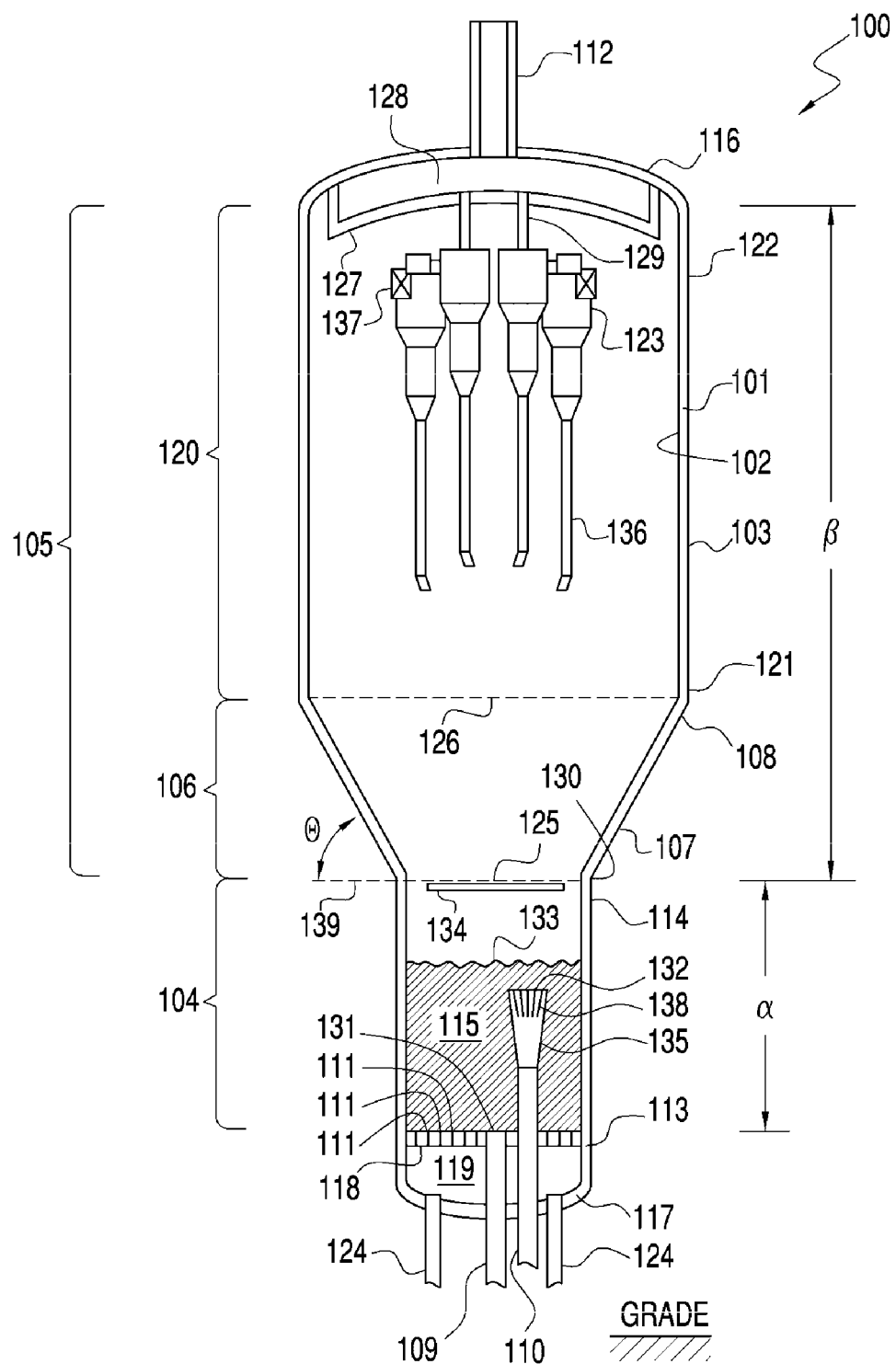
FIG. 1 illustrates a fluidized bed reactor or regenerator according to one embodiment of the present invention.

This invention provides novel processes and reaction systems for efficiently fluidizing a population of catalyst particles having a low catalyst fines content, and hence a large particle size distribution (PSD), by contacting the particles with baffles, preferably within a fluidized bed under fluidization conditions. Thus, the present invention is well-suited for fluidizing a population of catalyst particles having a low catalyst fines content in a fluidized bed reactor. As used herein, "fluidized bed reactor" means a reactor or catalyst regenerator in which a fluidized bed of catalyst particles is formed. The present invention also provides the ability to minimize entrained catalyst loss. Preferably, the fluidized bed reactor comprises an oxygenate to olefins (OTO) reactor or a catalyst regenerator. The invention is also directed to a population of catalyst particles having a low fines content, but exhibiting efficient fluidization characteristics.

II. Fluidizing Catalyst Particles Having a Low Fines Content

In a fluidized bed reaction process, catalyst particles contact a fluidizing medium such as a feedstock under conditions effective to cause the catalyst particles to behave in a fluidized manner. As they are fluidized, the catalyst particles are converted into an expanded, suspended mass that has many properties of a liquid. For example, the mass has a zero angle of repose, seeks its own level, and assumes the shape of the containing vessel. Catalyst fluidization processes are well known in the chemical engineering arts. See, e.g., Robert H. Perry & Don W. Green, *Perry's Chemical Engineers' Handbook* 17-2 to 17-18 (7th Ed. 1997). Examples of several reaction processes that typically occur in fluidized bed flow regimes include, but are not limited to, hydrocarbon cracking and reforming, oxidation of naphthalene to phthalic anhydride, and ammoxidation of propylene to acrylonitrile. Fluidized bed reaction processes are also often used for the regeneration of spent catalyst particles.

In a conventional OTO reaction system, a molecular sieve catalyst composition contacts an oxygenate-containing feedstock under conditions effective to convert at least a portion of the oxygenate in the oxygenate-containing feedstock to light olefins. As the feedstock contacts the molecular sieve catalyst compositions at high weight hourly space velocities and under extreme temperature and pressure conditions, a portion of the catalyst compositions can break up, e.g., attrit, to form one or more smaller attrited catalyst particles. Some catalyst attrition particles are very small in size and are referred to as catalyst fines.

As used herein, "catalyst fines" means a collection of formulated catalyst composition particles having a $d_{90}$ of no greater than 44 microns. Conversely, "catalyst non-fines" are defined herein as a collection of formulated catalyst composition particles having a $d_{90}$ of greater than 44 microns. "Catalyst coarses" is defined herein as a collection of formulated catalyst composition particles having a median particle diameter of at least 120 microns. As used herein, "catalyst non-coarses" are defined herein as a collection of formulated catalyst composition particles having a median particle diameter of less than 120 microns.

As used herein, a "median particle diameter" means the $d_{50}$ value for a specified plurality of particles. A $d_x$ particle size for purposes of this patent application and appended claims means that x percent, by volume, of a specified plurality of particles have a particle diameter no greater than the $d_x$ value. For the purposes of this definition, the particle size distribution (PSD) used to define the $d_x$ value is measured using well known laser scattering techniques using a Microtrac Model 53000 particle size analyzer from Microtrac, Inc. (Largo, Fla.). "Particle diameter" as used herein means the diameter of a specified spherical particle or the equivalent diameter of non-spherical particles as measured by laser scattering using a Microtrac Model 53000 particles size analyzer.

Due to their relatively high surface area to mass ratios, a portion of the catalyst fines in the reaction system may become undesirably entrained with the reaction effluent and exit the reaction system therewith. Catalyst fines also may become entrained with regenerator flue gas and be lost from the reaction system via the catalyst regenerator. Conversely, due to their relatively low surface area to mass ratios, larger particles such as catalyst coarses tend to be selectively retained in OTO reaction systems when the particles are attrition resistant and when only make-up for losses is practiced. The resulting catalyst population has an increased particles size distribution, e.g., $d_{50}$ value, and exhibits poor fluidization characteristics in the reactor as well as in the catalyst regenerator.

In one aspect, the present invention provides the ability to minimize entrained catalyst loss from a fluidized bed reactor. Although the present invention is directed toward minimizing entrained catalyst loss, a certain amount of entrained catalyst loss is unavoidable. Nevertheless, as catalyst fines are lost from the reaction and/or regeneration system, the invention also provides the ability to maintain desirable fluidization characteristics in a fluidized bed reactor, such as a catalyst regenerator, having a fluidized bed formed of a population of catalyst particles with a relatively low catalyst fines content. Thus, the benefits of the present invention are twofold: the present invention minimizes entrained catalyst loss, while maximizing the fluidization characteristics of remaining catalyst particles, should some catalyst fines be lost.

In one embodiment, the present invention is directed to a process for fluidizing catalyst particles in a reactor, preferably a fluidized bed reactor. The process includes the step of providing a plurality of catalyst particles in the reactor, wherein the catalyst particles have a $d_2$ value of greater than about 40, greater than about 50, or greater than about 60 microns. Additionally, the process includes the step of contacting the catalyst particles with a fluidizing medium under conditions effective to cause the catalyst particles to behave in a fluidized manner and form a fluidized bed. The process also includes the step of contacting the particles with one or more primary obstructing members while in the fluidized bed.

A population of catalyst particles having a $d_2$ value greater than 40 microns has a much lower catalyst fines content than catalyst populations typically employed in fluidized reaction systems. Populations of catalyst particles that have a low fines content have heretofore proven to have highly undesirable fluidization characteristics. For example, as a population of catalyst particles having a low fines content is fluidized, large "bubbles" tend to form within the bed. These bubbles hinder the flow of the catalyst particles into standpipes, through which catalyst particles exit the fluidized bed. As used herein, a population of catalyst particles having a "low fines content" means a population of catalyst particles having a $d_2$ value of greater than 40 microns. It has now been discovered, however, that by implementing one or more obstructing members, e.g., baffles, preferably within the fluidized bed, desirable fluidization characteristics can be advantageously maintained notwithstanding the relatively high $d_2$ value of the catalyst particles fluidized according to the present invention.

Optionally, the process of the present invention further comprises the step of: contacting a feedstock comprising an oxygenate with the plurality of catalyst particles under conditions effective to convert the oxygenate to light olefins and water. In this aspect, the fluidizing medium optionally comprises the feedstock. Thus, the fluidized bed reactor in this embodiment comprises an OTO reactor. In this embodiment, the catalyst particles preferably comprise molecular sieves selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AEI/CHA intergrowths, the metal containing forms thereof, and mixtures thereof.

Alternatively, at least a portion of the plurality of catalyst particles are at least partially coked, and the process further comprising the step of: contacting a regeneration medium with the plurality of catalyst particles under conditions effective to at least partially regenerate the at least partially coked catalyst particles. In this aspect, the regeneration medium optionally comprises air, and the fluidizing medium optionally comprises the regeneration medium. Thus, the fluidized bed reactor in this embodiment comprises a catalyst regenerator, preferably a catalyst regenerator in an OTO reaction system. Catalyst regeneration processes are also described in detail below.

Preferably, the fluidized bed reactor comprises a reaction zone and a separation zone, and the fluidized bed is situated within the reaction zone. If the fluidized bed reactor is a catalyst regenerator, the reaction zone is referred to as a regeneration zone. As the name suggests, the reaction occurring in the fluidized bed reactor occurs almost exclusively in the reaction zone to form gaseous products, which are transferred to the separation zone by pneumatic forces. A portion of the catalyst from the reaction zone may become entrained with the gaseous products and enter the separation zone therewith. Preferably, the separation zone is equipped with one or more separation devices, e.g., cyclone separators, to facilitate the separation of entrained catalyst from the gaseous products and return the catalyst back to the reaction zone. The obstructing members of the present invention, which ideally are situated within the fluidized bed, also preferably are situated in the reaction zone, although additional obstructing members (secondary obstructing members) may be situated within the separation zone for at least partially obstructing the upward flow of entrained catalyst, thereby further limited entrained catalyst loss. If the fluidized bed reactor comprises one or more secondary obstructing members in the separation zone, the secondary obstructing member(s) optionally are situated from about 0.5 to about 4 meters, more preferably from about 0.5 to about 2 meters, and most preferably from about 0.5 to about 1 meters above the surface of the fluidized bed. In terms of upper range limitations, the secondary obstructing member(s), or a portion thereof, optionally are situated less than 4 meters, less than 2 meters or less than 1 meter above the fluidized bed.

The improved fluidization characteristics of the population of catalyst particles having a low fines content may be characterized in a variety of manners. In one aspect, the fluidization ability of a population of catalyst particles in a fluidized bed reactor can be reflected by the catalyst system's axial vapor Peclet Number. The Peclet Number is a dimensionless number that reflects the relative departure from plug flow, which generally corresponds with a population of catalyst particles' fluidizability in a given fluidized bed reactor. A Peclet number of infinity (zero dispersion) is ideal plug flow, and a low Peclet number, say less than 4, describes a more completely mixed reactor. For purposes of the present invention, the "Peclet Number" (Pe) is defined by the following equation:

$$Pe = \frac{(U_g)(L)}{D}$$

wherein $U_g$ is the gas superficial velocity through the bed of catalyst;

L is the depth of the fluidized bed; and

D is the axial gas dispersion coefficient.

The axial dispersion coefficient, D, also referred to as the axial gas diffusion coefficient is in units of area/time, and is preferably determined by tracer experimentation as would be appreciated by one skilled in the art. Preferably, the population of catalyst particles having a low fines content has a Peclet Number of from about 4 to about 100, from about 8 to about 30, or from about 10 to about 20. Such Peclet Numbers are characteristic of a population of catalyst particles within a fluidized bed or riser reaction system having particularly good fluidization characteristics.

Thus, in another embodiment, the invention is to a plurality of fluidized catalyst particles in a fluidized bed having a $d_2$ value of greater than 40, greater than about 50 or greater than about 60 microns and having an axial gas Peclet number of from about 4 to about 100 when the particles are fluidized in a reactor having one or more primary obstructing members situated within the fluidized bed.

In another embodiment, the invention is to a reaction system, comprising: (a) a fluidized bed of a plurality of catalyst particles in a reactor, wherein the catalyst particles have a $d_2$ value of greater than about 40, greater than about 50, or greater than about 60 microns; and (b) one or more primary obstructing members situated within the fluidized bed for at least partially obstructing the upward flow of the catalyst particles.

In addition to the Peclet Number, the fluidization ability of a population of catalyst particles also may be reflected by the flow rate of the catalyst particles through a standpipe associated with the fluidized bed reactor. In a fluidized bed reactor, catalyst particles are routinely added and withdrawn from the fluidized bed for various reasons, e.g., for catalyst regeneration, for directing regenerated catalyst back to a principal reactor (if the fluidized bed reactor is a catalyst regenerator), to make room for fresh catalyst, etc. Typically, catalyst is removed from a fluidized bed through a standpipe, which in one embodiment is a substantially vertically oriented conduit in fluid communication with the fluidized bed and having an opening below the surface of the fluidized bed. It is contemplated, however, that the conduit may be inclined from the vertical by as much as 45-60°. Because the catalyst particles behave as a fluid in a fluidized bed, the catalyst particles will tend to flow into the standpipe opening and flow downwardly (in the proximal direction) through the standpipe. Optionally, the catalyst then is lifted to another vessel through a lift line or other transport device or flows by gravity directly into another receiving vessel.

As indicated above, a population of catalyst particles that exhibits poor fluidizability will less efficiently transfer catalyst particles to the fluidized bed reactor's standpipe than a population of catalyst particles that exhibits good fluidizability. Thus, the flow rate of the catalyst through the standpipe (or standpipes) is directly correlated to the population of catalyst particles fluidizability. In this aspect of the present invention, the flow rate refers to a region of the standpipe that does not receive a lifting medium, e.g., preferably a substantially vertically oriented region of the standpipe, rather than a lift line that may be associated with the standpipe.

Thus, in one embodiment of the present invention, the fluidized bed reactor further comprises a standpipe having an opening situated below the surface of the fluidized bed. A portion of the population of catalyst particles having a low fines enters the opening from the fluidized bed and flows through the standpipe at a superficial velocity of from about 0.1 to about 5 meters/sec, more preferably from about 0.25 to about 3 meters/sec, and most preferably from about 0.5 to about 2 meters/sec. In yet another embodiment, a portion of the population of catalyst particles having low fines enter the opening from the fluidized bed and flows through the standpipe at a superficial velocity of from about 0.5 to about 5 meters/sec, more preferably from about 1 to about 3 meters/sec, and most preferably from about 1.5 to about 2 meters/sec.

III. Fluidized Bed Reactor Design Parameters and Operating Conditions

As indicated above, the present invention is directed to fluidizing a population of catalyst particles having a low fines content in a fluidized bed reactor. Ideally, the fluidized bed reactor includes one or more obstructing members situated within the fluidized bed to facilitate the fluidization of the population of catalyst particles. Additionally or alternatively, the fluidized bed reactor is operated at certain operating conditions in order to maximize the fluidization characteristics of the catalyst particles contained therein. The preferred fluidized bed reactor design parameters and operating conditions will now be described in greater detail.

Catalyst fluidization characteristics can be improved and catalyst entrainment minimized according to the present invention by providing a fluidized bed reactor, e.g., catalyst regenerator, having specific design parameters, discussed below, and/or by carefully monitoring the catalyst flow regimes in the reaction and separation zones of the fluidized bed reactor.

The fluidized bed reactor preferably includes a reaction zone and a separation zone. In the reaction zone, the catalyst contacts a fluidizing medium under conditions effective to form a fluidized bed, which is a turbulent dense bed or phase. The conditions, e.g., temperature and pressure, also preferably are effective to either convert the fluidizing medium (which preferably comprises a feedstock) to gaseous product. The gaseous product exits the dense phase (fluidized bed) and forms a dilute phase, which extends from the surface of the dense phase to the top of the separation zone. The separation zone is adapted to separate the entrained catalyst from the gaseous product in the dilute phase, and return the entrained catalyst to the reaction zone.

If the fluidized bed reactor comprises a catalyst regenerator, then the reaction zone is referred to as a regeneration zone. In this embodiment, the contacting in the fluidized bed is effective to at least partially regenerate an at least partially coked catalyst and form regenerated catalyst. The regenerated catalyst may be fully or partially regenerated. In this aspect, the fluidizing medium preferably comprises a regeneration medium, described in detail below, which converts the carbonaceous deposits (coke) on the catalyst particles through combustion to various gaseous products of the regeneration process. Thus, the "product" in the catalyst regeneration process comprises various gaseous products of the regeneration process such as water vapor, carbon monoxide and carbon dioxide. The gaseous products, optionally with entrained catalyst and/or unreacted regeneration medium, exit the dense phase and form a dilute phase, which extends from the surface of the dense phase to the top of the separation zone. The separation zone is adapted to separate the entrained catalyst from the gaseous components in the dilute phase, and return the entrained catalyst to the regeneration zone. Ultimately, the gaseous products of the regeneration process are yielded from the separation zone as flue gas.

In one embodiment, the superficial velocity of the catalyst particles in the separation zone is lower than in conventional fluidized bed reactors. As used herein, superficial velocity means the average gas velocity in the total open cross section of a vessel at a specified elevation. By operating under lower superficial velocities in the separation zone, the inertia of each respective catalyst particle in the separation zone will be correspondingly lower than in conventional fluidized bed reactors. A reduction in entrained catalyst loss is realized when superficial velocity is reduced because only those solids whose terminal velocities are equal to or less than the gas superficial velocity continue to be entrained. Particles having terminal velocities greater than the gas superficial velocity will tend to fall back to the reaction zone. The particle terminal velocity is a function of the density difference between the particle and the fluidizing medium and the particle diameter squared.

The fluidized bed reactors of the present invention preferably have certain design parameters and/or operate at certain operation conditions that facilitate the fluidization of catalyst particles having a low fines content, while also providing desirable flow characteristics in the separation zone for reducing entrained catalyst loss.

The fluidized bed reactor preferably includes a reaction zone into which a fluidizing medium and catalyst is fed. The reaction zone has a first lower end, a first upper end and a first major length therebetween. The fluidized bed reactor also includes a separation zone provided to separate entrained catalyst from gaseous components, e.g., products of the reaction or regeneration process occurring in the fluidized bed reactor, and return the entrained catalyst to the reaction zone. The separation zone has a second lower end, a second upper end and a second major length therebetween. The separation zone includes a swaged region adjacent the second lower end of the separation zone, and the second lower end is in fluid communication with the first upper end. If the fluidized bed reactor is a catalyst regenerator, the fluidized bed reactor also includes a catalyst return into which regenerated catalyst can be fed from the reaction (regeneration) zone and from which the regenerated catalyst can be directed to the reactor. According to one embodiment, the ratio of the second major length to the first major length is greater than 1.0, 1.25, 1.5, 2.0, 3.0, 4.0 or 5.0. Where indicated herein, these ratios are exclusive of the swaged region. If not so indicated, then these ratios are inclusive of the swaged region, which will be factored into the second major length. By providing a catalyst fluidized bed reactor having these characteristics, desirable fluidization characteristics can be achieved, while minimizing entrained catalyst loss.

The separation zone optionally includes a swaged region and an upper separation region. The swaged region includes a narrow end and a broad end and increases in lateral cross-sectional area from the narrow end to the broad end. The narrow end is oriented at the proximal end of the swaged region, while the broad end is oriented adjacent the distal end of the swaged region. The broad end of the swaged region is adjacent to and in fluid communication with the upper separation region. The narrow end is oriented adjacent to and is in fluid communication with the reaction zone. The increase in cross-sectional area in swaged region is provided in order to reduce the superficial velocity of entrained catalyst as the catalyst passes from the narrow end to the broad end of swaged region. The upper separation region preferably is formed of a hollow cylinder, e.g., a tubular member, having a uniform or substantially uniform lateral cross-sectional area to provide uniform superficial velocity characteristics for entrained catalyst contained therein.

Optionally, the reaction zone has a first average diameter and the separation zone has a second average diameter. The ratio of the second average diameter to the first average diameter is at least about 1.1, at least 1.4, 1.7, 2.0, 2.3, 2.6 or 2.9. Where indicated herein, these ratios are exclusive of the swaged region. If not so indicated, then these ratios are inclusive of the swaged region, which will be factored in determining the second average diameter.

In terms of cross-sectional areas, the reaction zone has a first average cross-sectional area and the separation zone has a second average cross-sectional area, and the ratio of the second average cross-sectional area to the first average cross-sectional area optionally is at least 1.2, at least 2.0, 3.0, 4.0, 5.3, 6.8, or 8.5. Where indicated herein, these ratios are exclusive of the swaged region. If not so indicated, then these ratios are inclusive of the swaged region, which will be factored in determining the second average cross-sectional area.

Optionally, the catalyst particles have a first superficial velocity in the reaction zone and a second superficial velocity in the separation zone. In this aspect, the ratio of the first superficial velocity to the second superficial velocity optionally is at least 1.2, at least 2.0, 3.0, 4.0, 5.3, 6.8 or 8.5. Where indicated herein, these ratios are exclusive of the superficial velocity of the swaged region, if any. If not so indicated, then these ratios are inclusive of the superficial velocity in the swaged region, which will be factored into determining the second superficial velocity. The second superficial velocity optionally is less than about 1.0 meters per second, less than 0.5, 0.25, or 0.1 meters per second. If so indicated, these velocities are exclusive of the superficial velocity in the swaged region.

According to the present invention, the population of catalyst particles have a low fines content. These catalyst particles exhibit desirable fluidization characteristics by contacting one or more baffles in the fluidized bed. Thus, the fluidized bed reactor preferably includes one or more obstructing members, e.g., baffles, provided to obstruct the upward flow of entrained catalyst in the dense phase (fluidized bed) and/or the dilute phase. Obstructing members in the dilute phase operated to reduce entrained catalyst loss. Preferably, the obstructing member is positioned in the dense phase. As used herein, the terms "dense phase" and "fluidized bed" are synonymous with one another and are interchangeably used.

Figure 2A:
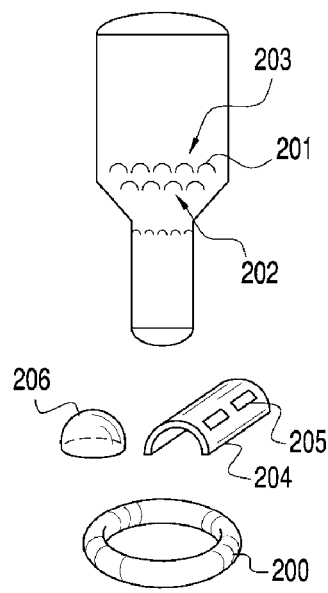
FIG. 2 A-E illustrates obstructing member configurations according to several embodiments of the present invention.

By orienting the obstructing member in the dense phase, the bubble size of the gaseous components in the dense phase can be advantageously reduced, which is particularly beneficial for a population of catalyst particles having a low fines content. The obstructing member also can be situated in a position where it breaks up larger bubbles. As a result, slugging and catalyst entrainment can be reduced. Additionally or alternatively, the obstructing member can be situated in one or more of the reaction zone above the dense phase surface, and/or in the separation zone (e.g., in the swaged region and/or in the upper separation region). If the fluidized bed reactor includes a plurality of layers of obstructing members, situated longitudinally with respect to one another, then each layer ideally is staggered with respect to its adjacent layer of obstructing members. By "staggered" it is meant that one layer is laterally offset with respect to a longitudinally adjacent layer. FIG. 2A, for example, illustrates a fluidized bed reactor having two layers of hemitubular members in the separation zone. These layers are staggered with respect to one another in order to further reduce entrained catalyst loss. A third layer of hemispherical obstructing members is illustrated in the reaction zone. However, the reaction zone also may include a plurality of layers, which preferably are staggered with respect to one or more adjacent layers.

A variety of obstructing member(s) may be implemented according to the present invention. Several possible obstructing members are illustrated in FIG. 2A-2E. In a preferred embodiment, the obstructing member comprises one or more laterally extending hemitubular members 201, as shown in FIG. 2A. The hemitubular members 201 preferably include a proximally-facing concave end 202 and a distally-facing convex end 203. The hemitubular member 201 may be formed of one or more linear laterally extending structures as shown by linear hemitubular member 204, which optionally includes one or more openings therein 205 to facilitate the flow of gaseous components therethrough. In another embodiment, the obstructing member comprises one or more hemispherical members 206, each of which also preferably includes a proximally-facing concave end and a distally-facing convex end. In another embodiment, the hemitubular member forms a ring 200, which also includes a proximally-facing concave end and a distally-facing convex end.

Figure 2B:
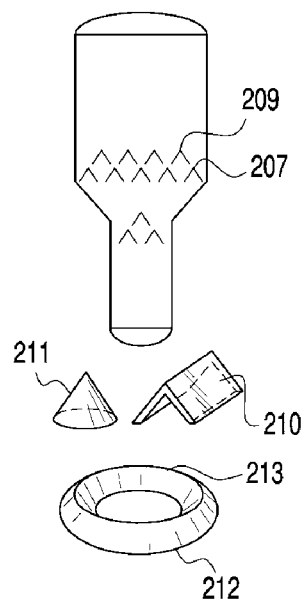

In another embodiment, the obstructing member comprises one or more laterally extending inverted "v" structures 207, as shown in FIG. 2B. Each inverted "v" structure 207 preferably includes a distally-facing apex 209 to divert proximally moving catalyst back to the reaction zone. The inverted "v" structure 207 optionally is formed of two substantially planar surfaces, as shown by "v" structure 210. The inverted "v" structure optionally includes one or more openings therein, not shown, similar to openings 205 in FIG. 2A. The openings facilitate the flow of gaseous components therethrough. In another embodiment, the obstructing member comprises one or more conical members 211 or pyramidal members (e.g., having triangular, square, rectangular, pentagonal or other geometrically shaped base). Optionally, the obstructing member lacks a laterally extending base. In another embodiment, the inverted "v" structure forms a ring 212, which also includes a distally-facing apex 213.

Figure 2C:
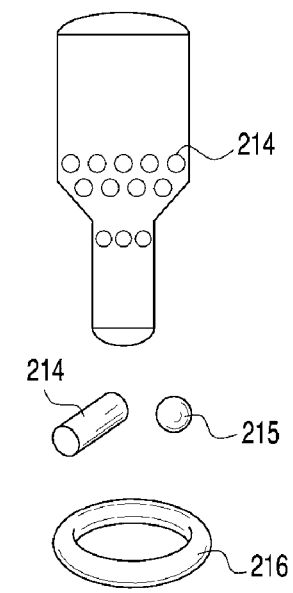

FIG. 2C illustrates another embodiment of the present invention, wherein the obstructing member comprises one or more laterally extending tubular members 214. Each tubular member 214 inherently includes a rounded surface to divert proximally moving catalyst back to the reaction zone. The tubular member 214 optionally includes one or more openings therein, not shown, similar to openings 205 in FIG. 2A, which openings facilitate the flow of gaseous components therethrough. In another embodiment, the obstructing member comprises one or more spherical members 215. In another embodiment, the obstructing member comprises a tubular ring 216.

Figure 2D:
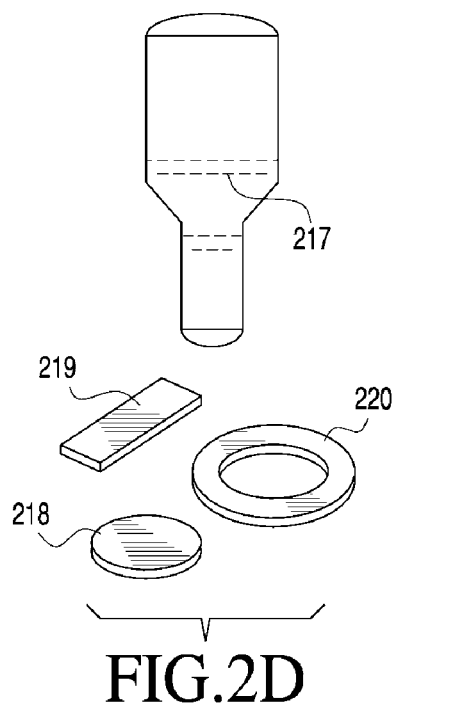

In another embodiment, the obstructing member comprises one or more laterally extending planar surfaces 217, as shown in FIG. 2D. Each planar surface 217 preferably includes a proximally facing major planar surface and a distally facing major planar surface. The shape of the laterally extending planar surfaces 217 optionally forms a circle 218, triangle, quadrilateral, square, rectangle 219, or any other two dimensional geometric shape. Each laterally extending planar surface 217 optionally includes one or more openings therein, not shown, similar to openings 205 in FIG. 2A. In another embodiment, the obstructing member comprises a planar ring 220 having an opening therein.

Figure 2E:
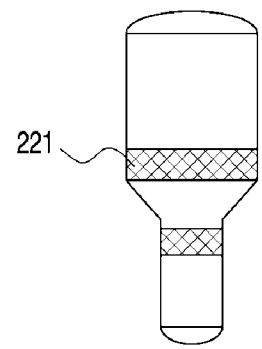

In another embodiment, the obstructing member comprises one or more screen members 221, as shown in FIG. 2E. In this embodiment, the one or more screen members 221 preferably cover the entire cross-sectional area of the region or zone in which the one or more screen members 221 are situated.

By implementing one or more of the features of the present invention, in addition to improving the fluidization characteristics, the entrained catalyst loss rate realized can be lower than in conventional fluidized bed reaction systems. In one embodiment, the catalyst loss rate is less than 0.146, less than 0.073, or less than 0.0365 grams catalyst lost per kilogram gas fed to the fluidized bed reactor.

IV. Catalyst Regeneration Processes

As indicated above, the invention relates to fluidizing catalyst particles in a fluidized bed reactor. In a preferred embodiment, the fluidized bed reactor comprises a catalyst regenerator, as discussed above. The catalyst regeneration process will now be described in greater detail.

During the catalytic conversion of hydrocarbons to various products, e.g., the catalytic conversion of oxygenates to light olefins (the OTO process), carbonaceous deposits accumulate on the catalyst used to promote the conversion reaction. At some point, the build up of these carbonaceous deposits causes a reduction in the capability of the catalyst to function efficiently. For example, in the OTO process, an excessively "coked" catalyst does not readily convert the oxygenate feed to light olefins. At this point, the catalyst is partially deactivated. When a catalyst can no longer convert the hydrocarbon to the desired product, the catalyst is considered to be fully deactivated. The catalyst regenerator of the present invention efficiently removes at least a portion of the carbonaceous deposits from an at least partially coked catalyst composition to form a regenerated catalyst composition having increased catalytic activity over the at least partially coked catalyst composition.

In a regeneration system, catalyst is withdrawn from a hydrocarbon conversion apparatus (HCA), e.g., a reactor or reaction unit, and is directed to a catalyst regenerator. Preferably, the HCA comprises an OTO reactor, and most preferably a methanol to olefin (MTO) reactor. The catalyst is partially, if not fully, regenerated in the catalyst regenerator. By regeneration, it is meant that the carbonaceous deposits are at least partially removed from the catalyst. Desirably, the catalyst withdrawn from the HCA is at least partially coked and, thus, at least partially deactivated. The remaining portion of catalyst in the HCA is re-circulated in the HCA without regeneration. The regenerated catalyst, with or without cooling, is then returned to the HCA.

Desirably, a portion of the catalyst, comprising molecular sieve and any other materials such as matrix materials, binders, fillers, etc., is removed from the HCA for regeneration and recirculation back to the HCA at a rate (catalyst weight/hour) of from about 0.05 times to about 1 times, more desirably from about 0.1 times to about 0.5 times, and most desirably from about 0.1 to about 0.3 times the total feed rate (oxygenate weight/hour) of oxygenates to the HCA. These rates pertain to the formulated molecular sieve catalyst composition, including non-reactive solids.

Desirably, the catalyst regeneration is carried out in a catalyst regenerator in the presence of a regeneration medium, typically a gas, comprising molecular oxygen or other oxidants. Examples of other oxidants include, but are not necessarily limited to, singlet $O_2$, $O_3$, $SO_3$, $N_2O$, $NO$, $NO_2$, $N_2O_5$, and mixtures thereof. Air and air diluted with nitrogen or $CO_2$ are particularly desirable regeneration mediums. The oxygen concentration in air can be reduced to a controlled level to minimize overheating of, or creating hot spots in, the catalyst regenerator. The catalyst can also be regenerated reductively with hydrogen, mixtures of hydrogen and carbon monoxide, or other suitable reducing gases.

The catalyst can be regenerated in any number of methods, such as batch, continuous, semi-continuous, or a combination thereof. Continuous catalyst regeneration is a desired method. Desirably, the catalyst is regenerated to a level of remaining coke from about 0.01 weight percent to about 15 weight percent, more preferably from about 0.01 to about 5 weight percent, based on the total weight of the regenerated catalyst composition.

The catalyst regeneration temperature should be from about 250° C. to about 750° C., and optionally from about 500° C. to about 700° C. Preferably the contacting of the coked catalyst with the regeneration medium in the regeneration zone occurs at a temperature of at least about 538° C., at least 649° C., or at least 710° C. Because the regeneration reaction preferably takes place at a temperature considerably higher than the OTO conversion reaction, e.g., about 93° C. to about 150° C. higher, it is desirable to cool at least a portion of the regenerated catalyst to a lower temperature before it is sent back to the HCA. One or more catalyst coolers, preferably located externally to the catalyst regenerator, optionally are used to remove heat from the regenerated catalyst after it has been withdrawn from the catalyst regenerator. When the regenerated catalyst is cooled, it is optionally cooled to a temperature that is from about 70° C. higher to about 80° C. cooler than the temperature of the catalyst withdrawn from the HCA. This cooled catalyst is then returned to either some portion of the HCA, the catalyst regenerator, or both. When the regenerated catalyst from the catalyst regenerator is returned to the HCA, it can be returned to any portion of the HCA. For example, the catalyst can be returned to a catalyst containment area to await contact with the feed, a separation zone to contact products of the feed or a combination of both.

Ideally, regeneration occurs in the catalyst regenerator at a pressure of from about 5 psig (34.5 kPag) to about 50 psig (345 kPag), preferably from about 15 psig (103 kPag) to about 40 psig (276 kPag), and most preferably from about 20 psig (138 kPag) to about 30 psig (207 kPag). The precise regeneration pressure is dictated by the pressure in the HCA. Higher pressures are generally preferred for lowering equipment size and catalyst inventory, however, higher pressures increase air blower power and cost.

Desirably, catalyst regeneration is carried out after the at least partially deactivated catalyst has been stripped of most of the readily removable organic materials (organics), e.g., interstitial hydrocarbons, in a stripper or stripping chamber. This stripping can be achieved by passing a stripping medium, e.g., a stripping gas, over the spent catalyst at an elevated temperature. Gases suitable for stripping include steam, nitrogen, helium, argon, methane, $CO_2$, CO, hydrogen, and mixtures thereof. A preferred gas is steam. The gas hourly space velocity (GHSV) of the stripping gas, based on volume of gas to volume of catalyst and coke, is from about 0.1 $hr^{-1}$ to about 20,000 $hr^{-1}$. Acceptable temperatures of stripping are from about 250° C. to about 750° C., and desirably from about 400° C. to about 600° C. Acceptable stripping pressures are from about 5 psig (34.5 kPag) to about 50 psig (344 kPag), more preferably from about 10 psig (69.0 kPag) to about 30 psig (207 kPag), and most preferably from about 20 psig (138 kPag) to about 25 psig (172 kPag). The stripping pressure is largely dependent upon the pressure in the HCA and in the catalyst regenerator.

The catalyst regenerator preferably includes a regeneration zone and a separation zone. In the regeneration zone, the at least partially coked catalyst contacts the regeneration medium, preferably as a turbulent dense bed or phase, under conditions effective, e.g., temperature and pressure, to at least partially regenerate the at least partially coked catalyst. Specifically, the conditions preferably are effective to convert the at least partially coked catalyst and the regeneration medium to regenerated catalyst and gaseous byproducts of the regeneration process. The regenerated catalyst may be fully or partially regenerated. The gaseous byproducts, optionally with entrained catalyst and/or unreacted regeneration medium, exit the dense phase and form a dilute phase, which extends from the surface of the dense phase to the top of the separation zone. The separation zone is adapted to separate the entrained catalyst from the gaseous components in the dilute phase, and return the entrained catalyst to the regeneration zone.

The dense phase density will depend on the solids particle density and the superficial gas velocity. Preferably, the density of the dense phase will range from about 10 lb/ft$^3$ (160.2 kg/m$^3$) to about 50 lb/ft$^3$ (800.9 kg/m$^3$), preferably from about 15 lb/ft$^3$ (240.3 kg/m$^3$) to about 35 lb/ft$^3$ (560.6 kg/m$^3$) and most preferably from about 20 lb/ft$^3$ (320.4 kg/m$^3$) to about 30 lb/ft$^3$ (480.6 kg/m$^3$). The superficial velocity in the dense phase optionally is no greater than 5 ft/sec (1.5 m/s), no greater than 4 ft/sec (1.22 m/s), no greater than 2 ft/sec (0.61 m/s), no greater than 1 ft/sec (0.30 m/s) or no greater than 0.5 ft/sec (0.15 m/s). Velocities much higher than 4 ft/sec (1.22 m/s) will result in a transition from a turbulent dense bed to a circulating fast fluid bed. In terms of lower range limits, the superficial velocity of the dense phase optionally is at least 0.1 ft/sec (0.03 m/s), at least 0.25 ft/sec (0.08 m/s), at least 0.5 ft/sec (0.15 m/s), or at least 0.75 ft/sec (0.23 m/s). Preferably, however, the superficial velocity in the dense phase ranges from 1.5 ft/sec (0.46 m/s) to 4.5 ft/sec (1.37 m/s), from 2.0 ft/sec (0.61 m/s) to 4.0 ft/sec (1.22 m/s), or from 2.5 ft/sec (0.76 m/s) to 3.5 ft/sec (1.07 m/s).

The regeneration zone includes one or more catalyst inlets for receiving an at least partially coked catalyst from the hydrocarbon conversion apparatus (HCA), typically a reactor or reaction unit. In one embodiment, the at least partially coked catalyst is transported in a catalyst supply conduit, e.g., a tubular member, from the HCA or an intermediate vessel, e.g., a catalyst stripper, to the regenerator. In the catalyst supply conduit, the catalyst preferably comes in contact with a fluidization agent under conditions effective to fluidize the catalyst contained therein. A non-limiting list of exemplary fluidization agents includes: steam, natural gas, nitrogen, argon, carbon dioxide or similar inert gases. The catalyst supply conduit receives the at least partially coked catalyst from the HCA or from an intermediate device such as a catalyst stripper and directs it to the catalyst regenerator. Thus, the catalyst supply conduit includes a first end in fluid communication with the HCA or intermediate device, and second end in fluid communication with the regeneration zone.

The catalyst supply conduit preferably enters the regeneration zone of the catalyst regenerator and releases the at least partially coked catalyst into the regeneration zone for carbonaceous deposit removal. The catalyst supply conduit optionally includes a plurality of second ends for evenly distributing the at least partially coked catalyst in the regeneration zone. In one preferred embodiment, the second end extends into the regeneration zone, preferably longitudinally with respect to the catalyst regenerator, and passes through a laterally extending distributor grid, described below. In this embodiment, the second end releases the at least partially coked catalyst composition into the regeneration zone at a position above the distributor grid. The bulk of the regeneration process preferably occurs in the dense phase of the regeneration zone. The dense phase optionally comprises from about 2 to about 45 volume percent, preferably from about 20 to about 35 percent of the regeneration zone, based on the total volume of the regeneration zone. On a weight basis, the dense phase preferably comprises from about 45 to about 98 percent, optionally from about 85 to about 95 percent, of the catalyst in the regeneration zone.

As used herein, "longitudinal" means extending in a direction perpendicular to grade, e.g., vertical, and "lateral" means extending in a direction parallel to grade, e.g., horizontal. The "proximal" end of an object is the portion of the object that is nearest to grade. The "distal" end of an object is the portion of the object that is furthest removed from grade. Thus, "proximally facing" means longitudinally facing the proximal end.

The regeneration zone also preferably includes one or more regeneration medium inlets for receiving a regeneration medium, preferably air, molecular oxygen, or a mixture thereof. One or more regeneration medium conduits carry the regeneration medium from a regeneration medium source, such as a pressurized regeneration medium containment vessel in which the regeneration medium is stored, to the one or more regeneration medium inlets. In one embodiment, one or more nozzles introduce the regeneration medium into the regeneration zone. Preferably, the regeneration medium is introduced into the catalyst regenerator at a rate of about 50 to about 500 standard cubic feet (scf)/lb coke burned (about 3.1 to about 31.2 standard cubic meters (scm)/kg coke burned), more preferably from about 150 to about 400 scf/lb coke burned (about 9.4 to about 25.0 scm/kg coke burned), and most preferably from about 200 to about 350 scf/lb coke burned (about 12.5 to about 21.9 scm/kg coke burned).

Figure 3:
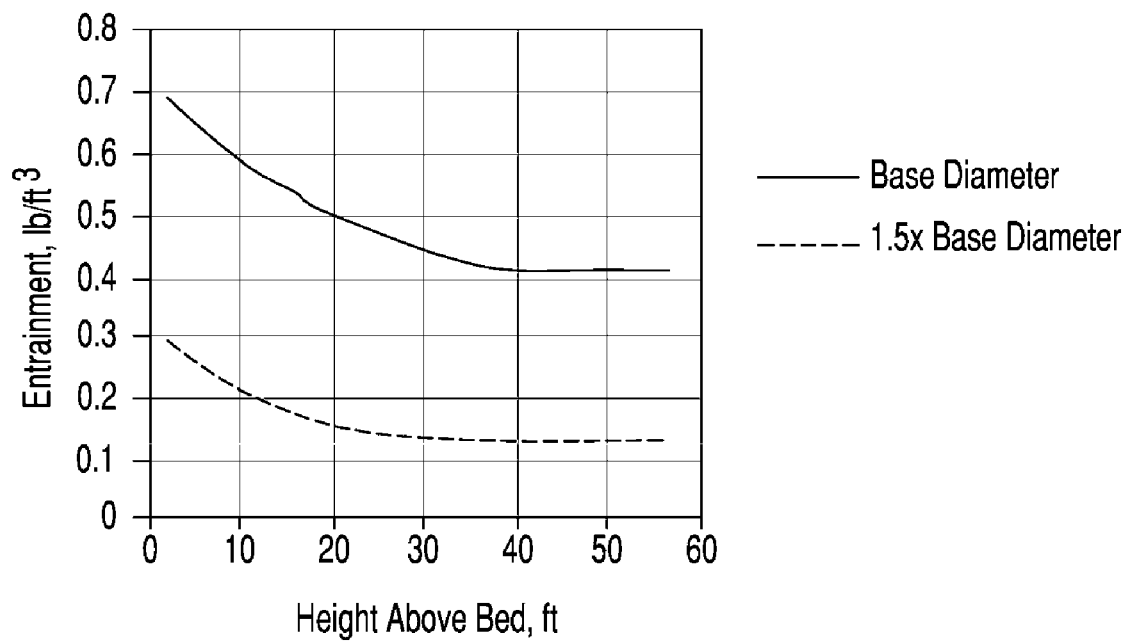
FIG. 3 presents a graph plotting catalyst entrainment as a function of height above a dense phase bed.

If the superficial velocity of the regeneration medium entering the catalyst regenerator is high, most of the regeneration medium and gaseous byproducts formed from the regeneration process will coalesce and flow through the dense phase in the form of bubbles. These bubbles rise in a suspended-solids phase and burst at the surface of the dense phase. The bursting action of the bubbles throws large amounts of the particulate solids into the dilute phase. Coarse particles tend to readily drop back into the dense bed. Thus, the solids density of the dilute phase decreases with height immediately above the dense phase surface, as shown in FIG. 3, which is a graph plotting catalyst entrainment as a function of height above the dense phase surface. At a certain height, however, further increases in height have a negligible impact on the solids density of the dilute phase. The point of the dilute phase at which solids entrainment remains substantially constant without regard to further increases in height is referred to herein as the transport disengaging height (TDH). The decreased effect of increasing regenerator height above the TDH is also illustrated in FIG. 3, wherein the decrease in catalyst entrainment approaches a minimum entrainment value (as shown, approximately 0.41 lb/ft$^3$ for the base diameter and 0.125 lb/ft$^3$ for 1.5× the base diameter) regardless of increases in height above the TDH.

According to one aspect of the present invention, the distance between the dense phase surface and the separation unit inlet, e.g., a cyclone inlet, is greater than the TDH. Increasing the diameter of the separation zone, however, further reduces catalyst entrainment by reducing the superficial velocity to a point below the terminal velocity of some of the entrained catalyst.

In another embodiment, the regeneration medium is released into a distribution zone prior to its introduction into the regeneration zone. The distribution zone is a region, which preferably is oriented below the regeneration zone, wherein the regeneration medium is initially released prior to its introduction into the regeneration zone. A partition having one or more openings (preferably a plurality of openings), also referred to herein as a distributor grid, separates the distribution zone from the regeneration zone. In this embodiment, the one or more openings function as one or more of the regeneration medium inlets evenly distributing the regeneration medium into the regeneration zone. The distributor grid optionally includes two opposing major planar surfaces, and the openings extend between the two opposing major planar surfaces. In one embodiment, the distributor grid comprises a pipe grid distributor, well-known to those skilled in the art. As the pressure of the regeneration medium increases within the distribution zone due to the influx of new regeneration medium from the one or more regeneration medium inlets, the regeneration medium passes through the openings in the distributor grid and enters the regeneration zone. In this embodiment, the regeneration medium feed rate to the distribution zone should be sufficiently high to prevent the back flow of catalyst into the distribution zone. The distribution zone and the distributor grid provide the ability to distribute the regeneration medium into the regeneration zone and thus provide even catalyst regeneration characteristics in the catalyst regenerator. The distribution zone and distributor grid provide the additional advantage of providing a low superficial velocity, discussed below, in the regeneration zone as well as in the separation zone.

Preferably, the gaseous byproducts from the regeneration process optionally with unreacted regeneration medium (collectively, gaseous components) flow from the regeneration zone to the separation zone for removal from the catalyst regenerator. Due to their light weight, small volume and correspondingly high surface area to weight ratios, some catalyst particles, particularly catalyst fines, may become entrained with these gaseous components and undesirably enter the separation zone. In the separation zone, a first amount of entrained catalyst particles desirably fall back into the regeneration zone and, ultimately, are redirected back to the HCA. The separation zone also optionally contains one or more separation devices, such as cyclonic separators, filters, screens, impingement devices, plates or cones, which facilitate the separation of entrained catalyst from the gaseous components in the separation zone. The separation zone optionally includes a plenum shell and a plenum volume for collecting gaseous components from the one or more separation devices. The plenum shell is in fluid communication with an exhaust outlet, and the gaseous components preferably are released from the separation zone through an exhaust outlet in the separation zone as an exhaust stream. According to one aspect of the present invention, the amount of entrained catalyst that exits the separation zone through the exhaust outlet with the gaseous components is minimized.

FIG. 1 presents a partial longitudinal cross-sectional view of a preferred fluidized bed reactor according to one embodiment of the present invention. As shown, the fluidized bed reactor is a catalyst regenerator, generally designated 100, although the features disclosed in catalyst regenerator 100 could also be employed in non-regenerator fluidized bed reactors.

The catalyst regenerator comprises a catalyst feed conduit 109, a catalyst return 110, one or more regeneration medium inlets 111, one or more regeneration medium feed conduits 124, an exhaust outlet 112, and a shell 101. Of course, the illustrated catalyst regenerator is purely exemplary, and the placement of regeneration medium feed conduits 124, catalyst feed conduit 109, catalyst return 110 or other components of the catalyst regenerator may vary widely depending on design preferences. Shell 101 includes an inner surface 102 and an outer surface 103, and defines regeneration zone 104, in which an at least partially coked catalyst contacts a regeneration medium under conditions effective to at least partially regenerate the coked catalyst. The shell 101 also defines separation zone 105 in which gaseous components are separated from entrained catalyst. The shell 101 also defines a regenerator top partition 116 and the regenerator bottom partition 117. The regenerator preferably is a "cold wall" vessel, meaning there is an inner insulating liner of refractory material, not shown, that insulates the shell 101. As a result, it is not necessary that the shell 101 be formed of a material capable of withstanding the extreme temperatures necessary for efficient catalyst regeneration. However, the separation devices 123, distributor grid 118, and obstructing members 134 should be formed of alloy steel, e.g., 304H SS, capable of withstanding the high temperatures necessary for catalyst regeneration.

Regeneration zone 104 includes a first lower end 113 and a first upper end 114. The first upper end 114 of the regeneration zone 104 is oriented distally with respect to the first lower end 113 and is adjacent the separation zone 105. As shown, the first lower end 113 of the regeneration zone 104 is defined by a distally facing surface of distributor grid 118. In embodiments lacking the optional distributor grid 118, the first lower end 113 of the regeneration zone 104 optionally is adjacent the inner surface of regenerator bottom partition 117. That is, the inner surface of regenerator bottom partition 117 optionally defines the first lower end 113 of regeneration zone 104. Preferably, the regeneration zone 104 is formed as a hollow cylinder, e.g., a tubular member, defining a constant or substantially constant cross-sectional hollow area throughout its longitudinal length, although the cross-section of regeneration zone 104 may form any of a variety of shapes such as a circle, oval, square, hexagon, etc. By providing a regeneration zone 104 having a constant cross-sectional area throughout its longitudinal length, however, desirably uniform catalyst regeneration properties, e.g., superficial velocity, can be realized.

The catalyst regenerator of the present invention also preferably includes an obstructing member 134 situated above or below dense phase surface 133. In a preferred embodiment, not shown, the obstructing member is situated in below dense phase surface 133. By situating the obstructing member within the dense phase 115, the fines-depleted population of catalyst particles can exhibit desirable fluidization characteristics. The obstructing member 134 is provided to abruptly stop upward inertial motion of entrained catalyst and break up "bubbles" formed in the dense phase 115. By improving the fluidization characteristics of a fines-depleted population of catalyst particles, the obstructing member 134 also facilitates the transfer of the catalyst particles into a standpipe, such as catalyst return 110, and ultimately back to the HCA, not shown.

The obstructing member 134 optionally is formed of a plate, disc, grid, conical member, screen or a "donut" member, e.g., formed of a member (preferably a circular disc member) having opposing major planar surfaces and one or more openings extending between the opposing major planar surfaces, or any other device capable of slowing the speed and thus the inertia of entrained catalyst through obstructing contact. Exemplary obstructing members are illustrated in FIG. 2A-E, discussed in detail above. The obstructing member 134 also directs combustion products and unreacted regeneration medium, if any, toward separation zone 105 and, ultimately, to exhaust outlet 112. The obstructing member 134 preferably has a similar cross-sectional profile to that of the catalyst regenerator 100 adjacent the position of the obstructing member 134. For example, if the cross-section of the catalyst regenerator is circular at the position of the obstructing member 134, then the obstructing member also preferably has a circular outer shape, which may or may not have angled surfaces to direct catalyst particles back to the regeneration zone 104. Conical obstruction members are particularly preferred, preferably lacking a base as shown in FIG. 2B, wherein the apex of the conical obstruction member is adjacent its distal end in order to direct entrained catalyst particles from separation zone 105 back to regeneration zone 104. One or more arms, not shown for clarity, preferably are provided to attach the obstructing member 134 to the inner surface 102 of shell 101, thereby supporting the obstructing member 134. The angle of the conical member or other angled obstructing member from a plane parallel to grade preferably is greater than the angle of repose, which is defined herein as being the natural angle that a specified plurality of particles makes with a horizontal surface as the particles are poured onto the surface. Preferably the angle of the conical member is greater than about 30°, more preferably greater than about 45°, and most preferably greater than about 60°.

In one embodiment, a plurality of obstructing members 134 are provided to create a labyrinth whereby entrained catalyst contacts a plurality of surfaces to further decrease its inertial motion. The labyrinth also provides a path for directing the gaseous components in the catalyst regenerator 100, ultimately, to the one or more separation devices 123 and to the exhaust conduit 112. Several non-limiting embodiments of labyrinth obstructing members are illustrated in FIGS. 2A-2E. In order to prevent stagnant catalyst buildup in one or more regions of the labyrinth, one or more obstructing members of the labyrinth optionally are formed having a downward slope (or rounded edge) for directing catalyst back to the regeneration zone 104 as shown in FIGS. 2A-2C. The optional downward slope preferably forms an angle from a plane parallel to grade, which angle is greater than solids natural angle of repose. Preferably the angle of the downward slop is greater than about 30°, more preferably greater than about 45°, and most preferably greater than about 60°.

Unless otherwise indicated, separation zone 105 includes a swaged region 106 and an upper separation region 120. However, in portions of this specification and the appended claims, when so indicated, the term "separation zone" is exclusive of the swaged region 106 and refers to separation region 120.

The swaged region 106 includes a narrow end 107 and a broad end 108 and increases in lateral cross-sectional area from the narrow end 107 to the broad end 108. The narrow end 107 is oriented at the proximal end of the swaged region 106, while the broad end 108 is oriented adjacent the distal end of the swaged region 106. In FIG. 1, the swaged region 106 is between broken line 125 and broken line 126, which are provided for illustration purposes only. Broken line 125 separates swaged region 106 and regeneration zone 104, and broken line 126 separates swaged region 106 from upper separation region 120. The narrow end 107 is oriented adjacent to and is in fluid communication with the first upper end 114 of the regeneration zone 104, and the broad end 108 is adjacent to and is in fluid communication with the upper separation region 120 of separation zone 105. The increase in cross-sectional area in swaged region 106 is provided in order to reduce the superficial velocity of entrained catalyst as the catalyst passes from the narrow end 107 to the broad end 108 of swaged region 106.

The upper separation region 120 preferably is formed of a hollow cylinder, e.g., a tubular member, having a uniform or substantially uniform lateral cross-sectional area to provide uniform superficial velocity characteristics for entrained catalyst contained therein. The upper separation region 120 includes a first end 121 and a second end 122. The first end 121 of the upper separation region 120 is adjacent to and in fluid communication with the broad end 108 of the swaged region 106; the second end 122 of the upper separation region 120 preferably is laterally adjacent to the regenerator top partition 116. If the catalyst regenerator 100 includes a plenum shell 127 and a plenum volume 128, as shown in FIG. 1 and as discussed in more detail below, then the second end 122 of the upper separation region 120 preferably is laterally adjacent to the proximally facing outer surface of the plenum shell 127.

The exhaust outlet 112, which releases regeneration combustion products and possibly unreacted regeneration medium from the catalyst regenerator 100, is openly joined to the top of one or more separation devices 123. Gas conduit 129 is openly joined to plenum shell 127. Plenum volume 128 is formed within the boundaries of plenum shell 127 as joined to the regenerator top partition 116 defined by shell 101. The plenum shell 127 and plenum volume 128 are provided to collect regeneration combustion product and possibly unreacted regeneration medium exiting gas conduit 129 and direct that material to the exhaust outlet 112, which is openly joined to upper separation region 120 in the vicinity of plenum volume 128. Exhaust outlet 112 conveys the regeneration combustion products and possibly unreacted regeneration medium away from the catalyst regenerator 100. Such plenum designs are particularly useful in embodiments when a plurality of separation devices 123 are utilized, for example as shown in FIG. 1, where two sets of cyclone separators are joined to a single exhaust outlet 112 via plenum volume 128. The gas conduits 129 optionally are all openly joined to the plenum shell 127, and a single, secondary product exit conduit, e.g., exhaust outlet 112, is implemented to carry combustion products and possibly unreacted regeneration medium away from the catalyst regenerator 100. The plenum shell 127 is optional in the catalyst regenerator 100 of the present invention as some separation devices, e.g., certain cyclonic separators, filters, screens, impingement devices, plates or cones, function adequately with direct gaseous product removal.

The longitudinal distance between the first lower end 113 and first upper end 114 of regeneration zone 104 defines first major length a of regeneration zone 104. Semantically, the separation zone 105 as a whole (including swaged region 106 and upper separation region 120), is referred to herein as including a second lower end and a second upper end. Unless otherwise indicated herein, the second lower end is the narrow end 107 of swaged region 106, and the second upper end is the second end 122 of upper separation region 120. The longitudinal distance between the second lower end and the second upper end of separation zone 105 defines second major length β of separation zone 105. That is, second major length β is measured from vertex 130 of swage angle θ longitudinally to the proximally facing outer surface of the plenum shell 127. If the catalyst regenerator 100 does not include a plenum shell, then the second major length β is measured from the vertex 130 of the swage angle to the proximally-facing inner surface of the regenerator top partition 116. In one embodiment of the present invention, the ratio of the second major length β to the first major length α is greater than 1.0, optionally greater than 1.25, 1.5, 2.0, 3.0, 4.0 or 5.0.

In a preferred embodiment, the separation zone 105, preferably the upper separation region 120 thereof, includes one or more separation devices 123, which are used to separate entrained catalyst from gaseous components in separation zone 105. The separation devices 123 optionally are cyclonic separators, filters, screens, impingement devices, plates, cones or any other device, which would separate entrained catalyst from the gaseous components in separation zone 105. The separation devices 123 shown in FIG. 1 are cyclonic separators, each having a separation unit inlet 137, which receives gaseous components and entrained catalyst from separation zone 105, and a catalyst return dipleg 136, which directs separated catalyst particles proximally with respect to the separation unit inlet 137.

The design and operation of cyclone separators are known to those skilled in the art. See, for example, U.S. Pat. No. 5,518,695, incorporated in its entirety herein by reference. In the operation of a cyclone separator, vapor reaction product and unreacted regeneration medium, if any, proceeds up the cyclone separator and out the top via gas conduit 129, while the catalyst proceeds down the cyclone separator through catalyst return dipleg 136, exiting into one or more of upper separation region 120, swaged region 106 and/or regeneration zone 104 (either above or below dense phase surface 133).

As shown, the catalyst return diplegs 136 extend and open into, e.g., are in fluid communication with, upper separation region 120. However, in other embodiments, not shown, the catalyst return diplegs 136 open into one or more of swaged region 106 and/or the regeneration zone 104. Optionally, one or more of the catalyst return diplegs 136 open into the dense phase 115 or the region of the regeneration zone 104 that is above the dense phase 115. In this embodiment, not shown, one or more catalyst return diplegs 136 optionally extend through obstructing plate 134. In yet another embodiment, the catalyst return diplegs 136 extend through shell 101 and act as the catalyst return 110. That is, one or more of separation devices 123 optionally are in direct closely-coupled fluid communication with the HCA (or with one or more intermediate vessels, e.g., catalyst coolers). In other embodiments, not illustrated, the separation devices are positioned externally to the separation zone 105, outside of the shell 101 defining the separation zone 105, or a combination of externally and internally positioned separation zones.

According to the present invention, an angle θ, referred to herein as the "swage angle", is formed in a plane perpendicular to the outer surface 103 at vertex 130. The swage angle is the angle between the outer surface 103 of the swaged region 106 and an imaginary plane, a portion of which is shown as broken line 139, which plane is parallel to grade. Of course, in order for the catalyst regenerator 100 to have a swaged region 106, the swage angle must be less than 90°. Preferably, swage angle θ is greater than the solids natural angle of repose in order to prevent the buildup of stagnant catalyst particles on the inner surface 102 of swaged region 106. Preferably the swage angle is greater than about 30°, more preferably greater than about 45°, and most preferably greater than about 60°. By providing a catalyst regenerator 100 having the disclosed swage angles, a desirable decrease in superficial velocity between the regeneration zone 104 and the upper separation region 120 can be obtained. This decrease in superficial velocity allows for increased entrained catalyst recovery and a commensurate decrease in operating expenses.

Lower swage angles, however, also may be implemented according to the present invention. In low swage angle embodiments, the buildup of stagnant catalyst particles along the inner surface 102 defining swaged region 106 can be controlled and reduced by providing one or more fluidization nozzles, not shown, in the swaged region 106. The fluidization nozzles inject a fluidization agent into the swaged region 106 at the inner surface 102 to facilitate the flow of catalyst particles from the swaged region 106 back to regeneration zone 104. Thus, the swage angle optionally is less than 30°, less than 20°, or less than 10°. By providing a low swage angle, the longitudinal length of the swaged region 102 can be reduced thereby providing a commensurate decrease in the production costs associated with building a catalyst regenerator according to the present invention.

In a preferred embodiment, the catalyst regenerator 100 includes a distribution zone 119, which ideally is oriented below the regeneration zone 104. Prior to its introduction into the regeneration zone 104, regeneration medium is introduced through one or more regeneration medium feed conduits 124 into the distribution zone 119. A distributor grid 118 separates the distribution zone 119 from the regeneration zone 104. The distributor grid 118 includes one or more regeneration medium inlets 111 (as shown, a plurality of regeneration medium inlets 111), through which the regeneration medium is released into the regeneration zone 104 from the distribution zone 119. The catalyst regenerator embodiment that includes a distributor grid provides for desirably even regeneration medium distribution characteristics. The distribution zone 119 and distributor grid 118 provide the additional advantage of providing a low superficial velocity in the regeneration zone 104 as well as in the separation zone 105.

A catalyst feed conduit 109 preferably is in fluid communication with the regeneration zone 104 and directs an at least partially coked catalyst, preferably in a fluidized manner, into the regeneration zone 104 through catalyst inlet 131. The catalyst feed conduit 109 optionally is in fluid communication with one or more of a HCA, a stripping unit, and/or a catalyst cooler, none of which are shown in FIG. 1. As shown in FIG. 1, catalyst feed conduit 109 extends through regenerator bottom partition 117, the distribution zone 119, and distributor grid 118. Thus, the catalyst feed conduit 109 preferably releases the at least partially coked catalyst directly into the regeneration zone 104 to form a dense phase 115. Optionally, some catalyst regeneration occurs within catalyst feed conduit 109 as the at least partially coked catalyst transported therein contacts the fluidization agent, typically air, under high temperature and pressure conditions.

In operation, the at least partially coked catalyst in dense phase 115 contacts a regeneration medium received via regeneration medium inlet(s) 111 under conditions effective to at least partially regenerate the at least partially coked catalyst. If the regeneration unit 100 does not include a distribution zone 119, then the catalyst feed conduit 109 passes through regenerator bottom partition 117 and releases the at least partially coked catalyst directly into the regeneration zone 104 to form the dense phase 115, without passing through distributor grid 118.

A catalyst return 110 also is provided in fluid communication with the regeneration zone 104. The catalyst return 110 directs the at least partially regenerated catalyst away from the regeneration zone 104 of the catalyst regenerator 100 and, ultimately, back to the HCA. As shown, catalyst return 110 includes a catalyst outlet 132 for receiving the at least partially regenerated catalyst from dense phase 115. Ideally, the catalyst return 110 is in fluid communication with a series of conduits that direct the at least partially regenerated catalyst back to the hydrocarbon conversion apparatus, optionally after it passes through a catalyst cooler, not shown. As shown in FIG. 1, catalyst return 110 extends through regenerator bottom partition 117, the distribution zone 119, and distributor grid 118, and preferably extends into dense phase 115, but below the dense phase surface 133. However, in other embodiments, not shown, the catalyst return 110 extends through the dense phase surface 133, and optionally extends into one or more of the following regions: the region of the regeneration zone 104 above the dense phase surface 133; the swaged region 106; and/or the upper separation region 120. Thus, catalyst outlet 132 optionally opens into and receives catalyst from the dense phase 115, the region of the regeneration zone 104 above the dense phase surface 133, the swaged region 106, and/or the upper separation region 120.

The distal end of catalyst return 110 optionally includes a fluted member 135, having a narrow proximal end and a broad distal end. The narrow proximal end is attached to a tubular conduit that forms catalyst return 110. The broad end forms catalyst outlet 132. The fluted member 135 provides a catalyst outlet 132 having increased receiving capacity and thus facilitates catalyst removal from the catalyst regenerator 100. The broad distal end optionally includes one or more grooves 138, which further increase the receiving capacity of the catalyst return 110 by increasing the receiving area of the catalyst outlet 132.

The geometry of the catalyst regenerator 100 may vary widely. In the embodiment in FIG. 1, the geometry is comprised of a first cylindrical member, which forms the regeneration zone 104, a partial conical section, which forms the swaged region 106, and a second cylindrical member (of greater diameter and cross-sectional area than the first cylindrical member), which forms the upper separation region 120. Optionally, the geometry of one or more of the regeneration zone 104, the swaged region 106, and/or the upper separation region 120 is comprised of a single, right frustum of a cone. Other suitable geometric shapes include, but are not limited to, triangular prisms, and frusta of pyramids, rectangular and square wedges and frusta of pyramids, and pentagonal, hexagonal, septagonal and octagonal prismatoids and frusta thereof, general and right. Further non-limiting examples include various polyhedrons, such as a tetrahedron, an octohedron, a dodecahedron or an icosahedron, and conical spheres and spherical sectors, and torus and barrels in their circular, elliptical or parabolic forms, and frusta thereof, general and right. Multiple occurrences of any of these geometric shapes defining one or more of the regeneration zone 104, the swaged region 106 and/or the upper separation region 120 are also within the scope of an apparatus of the present invention.

The size of the catalyst regenerator 100, and the sections thereof, depends on parameters such as the superficial gas velocity, solids hydrodynamics, pressure, and regeneration capacity of the catalyst regeneration process. In the present invention, the regeneration zone 104 desirably has a height from about 6 feet (1.8 m) to about 30 feet (9.1 m), preferably from about 10 feet (3.0 m) to about 20 ft (6.1 m). The upper separation region 120 desirably has a height from about 20 feet (6.1 m) to about 50 feet (15.2 m), preferably from about 25 feet (7.6 m) to about 45 feet (13.7 m) and most preferably from about 30 feet (9.1 m) to about 35 feet (10.7 m). Thus, the total summed height of separation zone 120 and regeneration zone 104 will be from about 26 to 80 feet (7.9 to 24.4 m), more preferably from about 35 to 70 feet (10.7 to 21.3 m), and most preferably from about 42 to about 55 feet (12.8 to 16.8 m). The height of the swaged region 106 depends upon the difference in diameter between the separation zone 120 and the regeneration zone 104 and upon the desired swage angle. Of course, larger or smaller heights and diameters may be implemented in these various regions of the catalyst regenerator 100 depending on the amount of coked catalyst to be regenerated therein.

One aspect of the present invention can be expressed by the ratio of the flow rate of catalyst entering the catalyst regenerator to the length of the regeneration zone and/or the separation zone. In one embodiment, the ratio is greater than 0.3 lb/sec/ft (0.45 kg/sec/m), optionally greater than 1.0 lb/sec/ft (1.5 kg/sec/m) and optionally greater than 6.0 lbs/sec/ft (9.0 kg/sec/m), based on the total length of the regeneration and separation zones.

In one particularly preferred embodiment, the ratio of the height of the separation zone 105 to the height of the regeneration zone 104 is greater than 1, preferably greater than 1.25, 1.5, 2.0, 3.0, 4.0 or 5.0.

In one embodiment of the present invention, the ratio of the average cross sectional area of the separation zone 105 to the average cross sectional area of the regeneration zone 104 is from about 1 to about 8.0, preferably from about 1.5 to about 3.0, and most preferably from about 2.0 to about 2.5. In terms of lower range limitations, the regeneration zone 104 has a first average cross-sectional area and the separation zone 105 has a second average cross-sectional area, and the ratio of the second average cross-sectional area to the first average cross-sectional area optionally is at least about 1.2, at least 2.0, 3.0, 4.0, 5.3, 6.8, or 8.5.

Figures 4A, 4B:
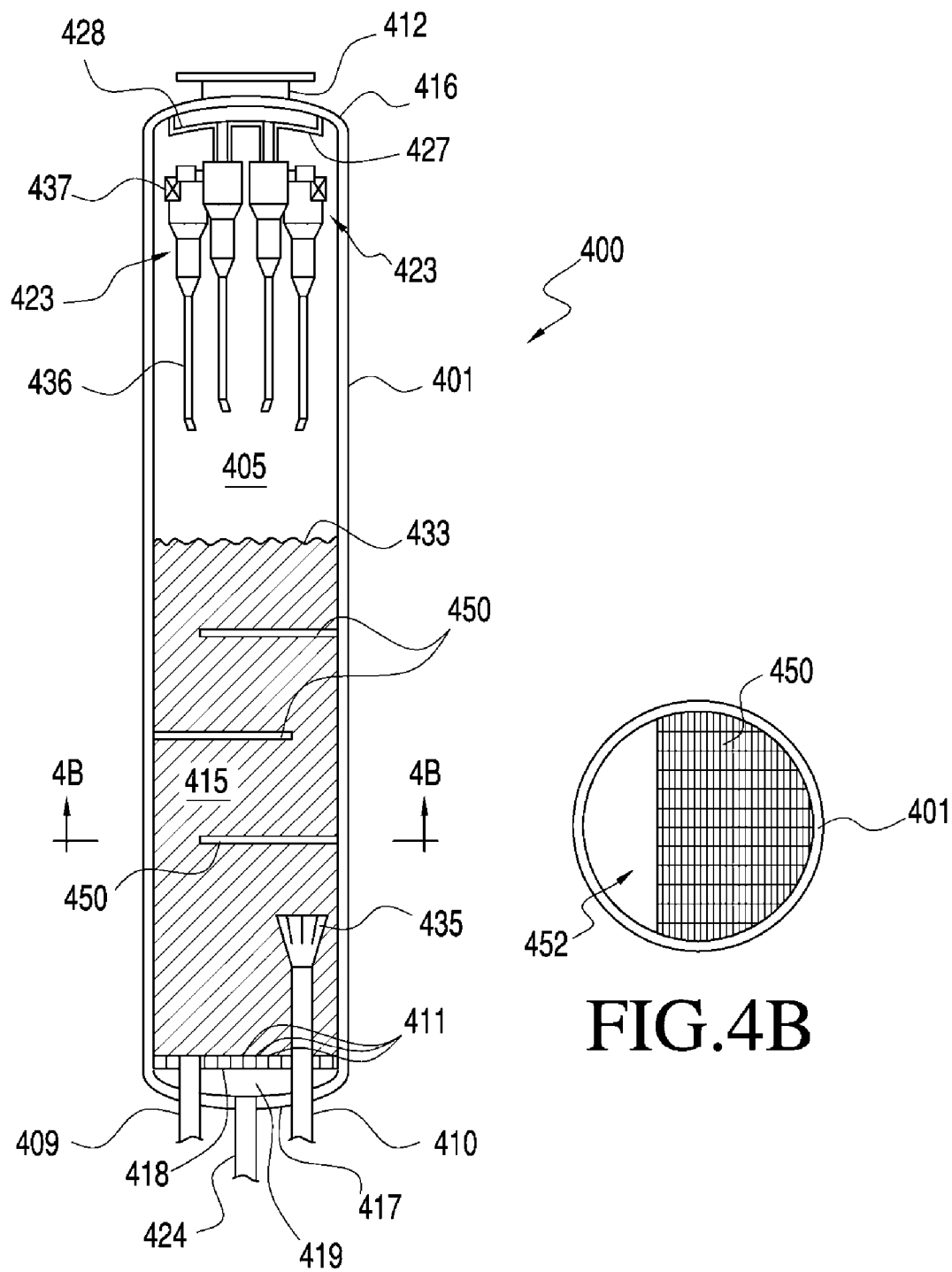
FIG. 4 illustrates a fluidized bed reactor or regenerator according to another embodiment of the present invention.

FIG. 4A illustrates a partial longitudinal cross-sectional view of an fluidized bed reactor according to another embodiment of the present invention. As shown, the fluidized bed reactor is a catalyst regenerator, generally designated 400, although the features disclosed in catalyst regenerator 400 could also be employed in non-regenerator fluidized bed reactors. The regenerator 400 of FIG. 4A comprises multiple levels of obstructing members 450 spanning a fraction of the diameter of the fluidized bed 415. Thus, each obstructing member 450 forms a "notch," or a completely open area opposite the baffle within the plane of the baffle.

The catalyst regenerator comprises a catalyst feed conduit 409, a catalyst return 410, one or more regeneration medium inlets 411, one or more regeneration medium feed conduits 424, an exhaust outlet 412, and a shell 401. Of course, the illustrated catalyst regenerator is purely exemplary, and the placement of regeneration medium feed conduits 424, catalyst feed conduit 409, catalyst return 410 or other components of the catalyst regenerator may vary widely depending on design preferences. Shell 401 includes an inner surface and an outer surface, and defines the side walls of dense phase 415, in which an at least partially coked catalyst contacts a regeneration medium under conditions effective to at least partially regenerate the coked catalyst. The shell 401 also defines separation zone 405 in which gaseous components are separated from entrained catalyst. The shell 401 also defines a regenerator top partition 416 and the regenerator bottom partition 417. The regenerator preferably is a "cold wall" vessel, meaning there is an inner insulating liner of refractory material, not shown, that insulates the shell 401. As a result, it is not necessary that the shell 401 be formed of a material capable of withstanding the extreme temperatures necessary for efficient catalyst regeneration. However, the separation devices 423, distributor grid 418, and obstructing members 450 should be formed of alloy steel, e.g., 304H SS, capable of withstanding the high temperatures necessary for catalyst regeneration. In another embodiment, one or more of the obstructing members 450 are refractory lined to protect them from erosion.

The lower end of the dense phase 415 is bordered by a distally facing surface of distributor grid 418. In embodiments lacking the optional distributor grid 418 (e.g., implementing a sparger), the lower end of the dense phase 415 optionally is adjacent the inner surface of regenerator bottom partition 417. That is, the inner surface of regenerator bottom partition 417 optionally defines the lower end of dense phase 415. As shown, the dense phase 415 is formed as a hollow cylinder, e.g., a tubular member, defining a constant or substantially constant cross-sectional hollow area throughout its longitudinal length, although the cross-section of dense phase 415 may form any of a variety of shapes such as a circle, oval, square, hexagon, etc. By providing a dense phase 415 having a constant cross-sectional area throughout its longitudinal length, however, desirably uniform catalyst regeneration properties, e.g., superficial velocity, can be realized.

The catalyst regenerator of the present invention also preferably includes a plurality of obstructing members 450 situated above or below dense phase surface 433. As shown, the obstructing members 450 are situated below dense phase surface 433. By situating the obstructing members 450 within the dense phase 415, the fines-depleted population of catalyst particles can exhibit desirable fluidization characteristics. The obstructing members 450 are provided to abruptly stop and break apart upward inertial motion of entrained catalyst and break up "bubbles" formed in the dense phase 415. By improving the fluidization characteristics of a fines-depleted population of catalyst particles, the obstructing members 450 also facilitate the transfer of the catalyst particles into a standpipe, such as catalyst return 410, and ultimately back to the HCA, not shown. The distance between longitudinally adjacent obstructing members may vary widely depending on many factors. Optionally, the distance between longitudinally adjacent obstructing members is greater than about 0.5 meter, greater than about 1 meter, greater than about 2 meters, or greater than about 5 meters. In terms of upper range limits, the distance between longitudinally adjacent obstructing members optionally is less than about 10 meters, less than about 7 meters, less than about 5 meters, or less than about 3 meters.

In the embodiment shown in FIG. 4A, three obstructing members 450 are shown, each formed of a plate or disc, which covers a portion of the lateral cross-sectional area of dense phase 415. Each obstructing member 450 has opposing major planar surfaces shown including a plurality of openings extending between the opposing major planar surfaces. The obstructing members 450 also direct combustion products and unreacted regeneration medium, if any, toward separation zone 405 and, ultimately, to exhaust outlet 412. In the embodiment shown, each obstructing member 450 is formed of a "subway grate" style obstructing member with multiple intersecting horizontal pieces separated by openings on the order of a few inches to break-up larger gas bubbles formed when fines content is low. FIG. 4B shows a detailed lateral view of an obstructing member 450 along line 4B-4B. As shown, each obstructing member 450 is formed of a substantially planar surface having openings therein to allow the passage of catalyst particles and or gases therethrough while breaking up bubble formation in dense phase 415. The total open area within the entire laterally extending plane of a given obstructing member 450, including the open area 452, optionally is greater than about 50%, preferably greater than about 70%, and most preferably greater than about 90% of the area of cross sectional area.

Preferably, the regenerator 400 includes multiple levels (three are shown) of internal obstructing members 450 spanning a fraction of the dense phase 415 diameter so each obstructing member 450 forms a "notch" or open area 452. The completely open area 452 in the plane of an obstructing member 450 is preferably less than 75%, preferably less than 50%, and most preferably between about 10 and about 25% of the total cross sectional area of the dense phase 415. Preferably adjacent open areas 452 defined by adjacent obstructing members 450 are staggered with respect to one another as shown. By "staggered" it is meant that adjacent open areas 452 do not totally overlap one another, although it is contemplated that adjacent open areas 452 may overlap one another to some extent.

Although shown as being cylindrical in form, the regenerator 400 optionally has a swaged region as discussed above.

The separation zone 405 preferably is formed of a hollow cylinder, e.g., a tubular member, having a uniform or substantially uniform lateral cross-sectional area to provide uniform superficial velocity characteristics for entrained catalyst contained therein. Optionally, catalyst regenerator 400 includes a plenum shell 427 and a plenum volume 428, as shown in FIG. 4A.

The exhaust outlet 412, which releases regeneration combustion products and possibly unreacted regeneration medium from the catalyst regenerator 400, is openly joined to the top of one or more separation devices 423. Plenum volume 428 is formed within the boundaries of plenum shell 427, which is joined to the regenerator top partition 416. The plenum shell 427 and plenum volume 428 are provided to collect regeneration combustion product and possibly unreacted regeneration medium exiting separation devices 423 and direct that material to the exhaust outlet 412, which is openly joined to separation zone 405 in the vicinity of plenum volume 428. Exhaust outlet 412 conveys the regeneration combustion products and possibly unreacted regeneration medium away from the catalyst regenerator 400. Such plenum designs are particularly useful in embodiments when a plurality of separation devices 423 are utilized, for example as shown in FIG. 4A, where two sets of cyclone separators are joined to a single exhaust outlet 412 via plenum volume 428. The plenum shell 427 is optional in the catalyst regenerator 400 of the present invention as some separation devices, e.g., certain cyclonic separators, filters, screens, impingement devices, plates or cones, function adequately with direct gaseous product removal.

In a preferred embodiment, the separation zone 405, preferably the upper region thereof, includes one or more separation devices 423, which are used to separate entrained catalyst from gaseous components in separation zone 405. The separation devices 423 optionally are cyclonic separators, filters, screens, impingement devices, plates, cones or any other device, which would separate entrained catalyst from the gaseous components in separation zone 405. The separation devices 423 shown in FIG. 4A are cyclonic separators, each having a separation unit inlet 437, which receives gaseous components and entrained catalyst from separation zone 405, and a catalyst return dipleg 436, which directs separated catalyst particles proximally with respect to the separation unit inlet 437.

In a preferred embodiment, the catalyst regenerator 400 includes a distribution zone 419, which ideally is oriented below the regeneration zone dense phase 415. Prior to its introduction into the dense phase 415, regeneration medium is introduced through one or more regeneration medium feed conduits 424 into the distribution zone 419. A distributor grid 418 separates the distribution zone 419 from the dense phase 415. The distributor grid 418 preferably is formed of a grid or screen, which includes one or more regeneration medium inlets 411 (as shown, a plurality of regeneration medium inlets 411), through which the regeneration medium is released into the dense phase 415 from the distribution zone 419. The catalyst regenerator embodiment that includes a distributor grid provides for desirably even regeneration medium distribution characteristics. The distribution zone 419 and distributor grid 418 provide the additional advantage of providing a low superficial velocity in the regeneration zone 404 as well as in the dense phase 415.

A catalyst feed conduit 409 preferably is in fluid communication with the dense phase 415 and directs an at least partially coked catalyst, preferably in a fluidized manner, into the regeneration zone. The catalyst feed conduit 409 optionally is in fluid communication with one or more of a HCA, a stripping unit, and/or a catalyst cooler, none of which are shown in FIG. 4A. As shown in FIG. 4A, catalyst feed conduit 409 extends through regenerator bottom partition 417, the distribution zone 419, and distributor grid 418. Alternatively, the catalyst feed conduit 409 can enter from the side of the vessel above or within dense phase 415. Thus, the catalyst feed conduit 409 preferably releases the at least partially coked catalyst directly into the regeneration zone to form dense phase 415. Optionally, some catalyst regeneration occurs within catalyst feed conduit 409 as the at least partially coked catalyst transported therein contacts the fluidization agent, typically air, under high temperature and pressure conditions. In another embodiment, not shown, the catalyst feed conduit 409 opens into the side of the shell 401 so as to introduce the at least partially coked catalyst into a higher region of the dense phase 415.

In operation, the at least partially coked catalyst in dense phase 415 contacts a regeneration medium received via regeneration medium inlet(s) 411 under conditions effective to at least partially regenerate the at least partially coked catalyst. If the regeneration unit 400 does not include a distribution zone 419, then the catalyst feed conduit 409 passes through regenerator bottom partition 417 and releases the at least partially coked catalyst directly into the regeneration zone to form the dense phase 415, without passing through distributor grid 418.

A catalyst return 410 also is provided in fluid communication with the regeneration zone. The catalyst return 410 directs the at least partially regenerated catalyst away from the regeneration zone of the catalyst regenerator 400 and, ultimately, back to the HCA. As shown, catalyst return 410 includes a catalyst outlet for receiving the at least partially regenerated catalyst from dense phase 415. Ideally, the catalyst return 410 is in fluid communication with a series of conduits that direct the at least partially regenerated catalyst back to the hydrocarbon conversion apparatus, optionally after it passes through a catalyst cooler, not shown. As shown in FIG. 4A, catalyst return 410 extends through regenerator bottom partition 417, the distribution zone 419 and distributor grid 118, and preferably extends into dense phase 415 below the dense phase surface 433. However, in other embodiments, not shown, the catalyst return 410 extends through the dense phase surface 433, and optionally extends into the separation zone 405. Thus, the catalyst outlet optionally opens into and receives catalyst from the dense phase 415 or the separation zone 405.

Preferably, the catalyst return 410 opens into the dense phase 415 below the lower-most obstructing member by about 1 to about 3 meters. Alternatively, the catalyst return 410 extends through one or more of the obstructing members 450. In another embodiment, the catalyst return 410 forms an opening in the shell 401, e.g., at the side of the vessel, and is in fluid communication with a downwardly angled conduit, not shown.

The distal end of catalyst return 410 optionally includes a fluted member 435, having a narrow proximal end and a broad distal end which forms the catalyst outlet. The narrow proximal end is attached to a tubular conduit that forms catalyst return 410. The fluted member 435 provides a catalyst outlet having increased receiving capacity and thus facilitates catalyst removal from the catalyst regenerator 400. The broad distal end optionally includes one or more grooves, which further increase the receiving capacity of the catalyst return 410 by increasing the receiving area of the catalyst outlet.

Figures 5A, 5B:
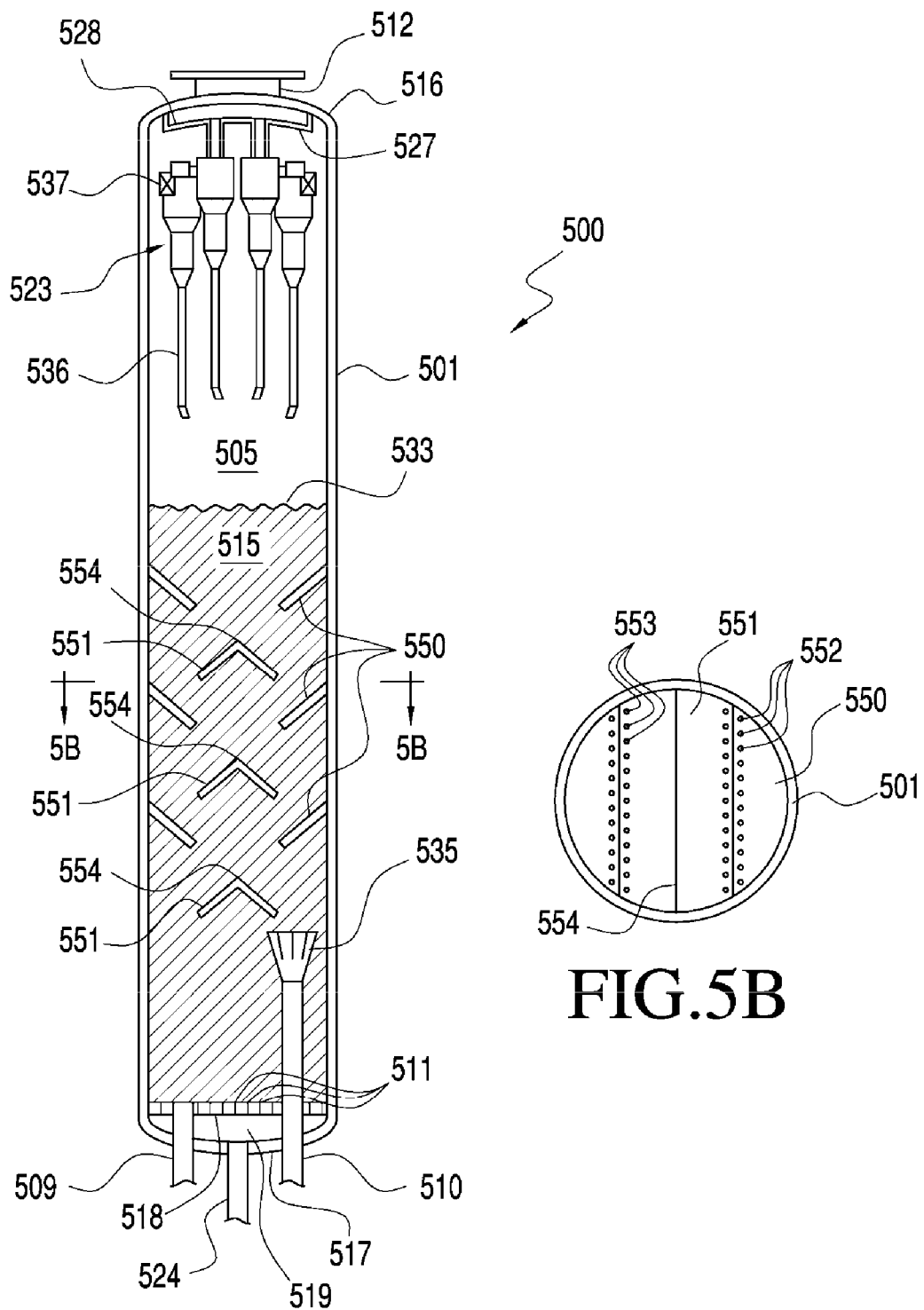
FIG. 5 illustrates a fluidized bed reactor or regenerator according to another embodiment of the present invention.

FIG. 5A illustrates a partial longitudinal cross sectional view of a fluidized bed reactor according to another embodiment of the present invention. As shown, the fluidized bed reactor is a catalyst regenerator, generally designated 500, although the features disclosed in catalyst regenerator 500 could also be employed in non-regenerator fluidized bed reactors. The regenerator 500 of FIG. 5A comprises multiple levels of obstructing members. Specifically, the obstructing members illustrated in FIG. 5A comprise shed-type baffles formed of multiple inverted "V" shaped members. Specifically, as shown, the obstructing members comprise central obstructing members 551 and side obstruction members 550.

The catalyst regenerator 500 comprises a catalyst feed conduit 509, a catalyst return 510, one or more regeneration medium inlet 511, one or more regeneration medium feed conduits 524, and exhaust outlet 512, and a shell 501. Of course, the illustrated catalyst regenerator is purely exemplary and the placement of regeneration medium feed conduct 524, catalyst feed conduit 509, catalyst return 510 or other components of the catalyst regenerator 500 may vary widely depending on design preferences. Shell 501 includes an inner surface and an outer surface, and defines the sidewalls of dense phase 515, in which an at least partially coked catalyst contacts a regeneration medium under conditions effective to at least partially regenerate the coked catalyst. The shell 501 also defines separation zone 505 in which gaseous components are separated from entrained catalysts. The shell 501 also defines a regenerator top partition 516 and the regenerator bottom partition 517. Optionally, the shell 501 is insulated with an inner insulating liner of refractory material, not shown. Separation devices 523, distributor grid 518, and the obstructing members should be formed of an alloy of steel, e.g., 304H SS, capable of withstanding the high temperatures necessary for catalyst regeneration and optionally covered in erosion resistant refractory.

The lower end of the dense phase 515 is bordered by a distally facing surfaced of distributor grid 518. In embodiments lacking the optional distributor grid 518 (e.g., implementing a sparger), the lower end of the dense phase 515 optionally is adjacent the inner surface of regenerator bottom partition 517. That is, the inner surface of regenerator bottom partition 517 optionally defines the lower end of dense phase 515. As shown, the dense phase 515 is formed of a hollow cylinder, e.g. a tubular member, defining a constant or substantially constant cross sectional hollow area throughout its longitudinal length, although the cross section of dense phase 515 may form any of a variety of shapes such as a circle, oval, square, hexagon, etc. By providing a dense phase 515 having a constant cross sectional area throughout its longitudinal length, however, desirably uniform catalyst regeneration properties, e.g. superficial velocity, can be realized.

The catalyst regenerator 500 of the present invention also preferably includes a plurality of obstructing members situated above or below dense phase surface 533. As shown, the obstructing members comprise central obstructing members 551 and outer obstructing members 550, both of which are entirely situated below dense phase surface 533. By situating the obstructing members within the dense phase 515, a fines-depleted population of catalyst particles can exhibit desirable fluidization characteristics. The obstructing members are provided to abruptly stop upward inertial motion of entrained catalysts and break up "bubbles" formed in the dense phase 515. By improving the fluidization characteristics of a fines-depleted population of catalyst particles, the obstructing members also facilitate the transfer of the catalyst particles into a standpipe such as catalyst return 510 and ultimately back to the HCA, not shown.

In the embodiment shown in FIG. 5A, three central obstructing members 551 are shown, each formed of an inverted "V" shaped shed-type baffle, which covers a portion of the lateral cross sectional area of dense phase 515. FIG. 5A also illustrates three levels of outer obstructing members 550, which are situated between each level of central obstructing members 551. That is, in the embodiment shown, each level or layer of obstructing members preferably alternates between a central obstructing member 551 and an outer obstructing member 550 creating a labyrinth through which a catalyst particle must travel in order to reach dense phase surface 533.

In one embodiment, not shown, each obstructing member is formed of a "subway grate" as discussed above with reference to FIGS. 4A and 4B.

FIG. 5B shows a detailed lateral view of a central obstructing member 551 and an outer obstructing member 550. As shown, the central obstructing members 551 each comprise an apex 554 and extends from one end of the regenerator 500 to the other. Preferably, each respective outer obstructive member 550 extends along a chord which overlaps an adjacent central obstructing member 551 along its outer edge. Optionally, each central obstructing member 551 and/or each outer obstructing member 550 comprises a plurality of openings 553 and 552, respectively, which traverse the edges of the obstructing members to facilitate the break up of bubbles in dense phase 515.

Preferably, the regenerator 500 includes multiple levels of central obstructing members 551, each of which spans a fraction of the dense phase 515 diameter so as to form an open area, which preferably is overlapped by an adjacent outer obstructing member 550.

The separation zone 505 preferably is formed of a hollow cylinder, e.g. a tubular member, having a uniform or substantially uniform lateral cross sectional area so as to provide uniform superficial velocity characteristics for entrained catalysts contained therein. Optionally, catalyst regenerator 500 includes a plenum shell 527 and a plenum volume 528, as shown in FIG. 5A.

The exhaust outlet 512, which release regeneration combustion products and possibly unreacted regeneration medium from the catalyst regenerator 500, is openly joined at the top of one or more separation devices 523. Plenum volume 528 is formed within the boundaries of plenum shell 527, which is joined to the regenerator top partition 516. The plenum shell 527 and plenum volume 528 are provided to collect regeneration combustion products and possibly unreacted regeneration medium existing separation devices 523 and direct the material to the exhaust outlet 512, which is openly joined to separation zone 505 in the vicinity of plenum volume 528. Exhaust outlet 512 conveys the regeneration combustion products and possibly unreacted regeneration medium away from the catalyst regenerator 500. Such plenum designs are particularly useful in embodiments where a plurality on separation devices 523 are utilized, for example, as shown in FIG. 5A, where two sets of cyclone separators are joined to a single exhaust outlet 512 via plenum volume 528. The plenum shell 527 is optional in the regenerator 500 of the present invention as some separation devices, e.g., certain cyclonic separators, filters, screens, impingement devices, plates or cones, function adequately with direct gaseous product removal.

In a preferred embodiment, the separation zone 505, preferably the upper region thereof, include one or more separation devices 523, which are used to separate and trained catalysts from gaseous components in separation zone 505. The separation devices 523 optionally are cyclonic separators, filters, screens, impingement devices, plates, cones or any other device which would separate entrained catalysts from the gaseous components in separation zone 505. The separation devices 523 shown in FIG. 5A are cyclonic separators, each having a separation unit inlet 537, which receives gaseous components and entrained catalyst from separation zone 505, and a catalyst return dipleg 536, which directs separate catalyst particles proximally with respect to the separation unit inlet 537.

In a preferred embodiment, the catalyst regenerator 500 includes a distribution zone 519, which ideally is oriented below the regeneration zone dense phase 515. Prior to its introduction into the dense phase 515, regeneration medium is introduced through one or more regeneration medium feed conduits 524 into the distribution zone 519. A distributor grid 518 separates the distribution zone 519 from the dense phase 515. The distributor grid 518 includes one or more regeneration medium inlets 511 (as shown, a plurality of regeneration medium inlets 511), through which the regeneration medium is released into the dense phase 515 from the distribution zone 519. The catalyst regenerator embodiment that includes a distributor grid provides for desirably even regeneration medium distribution characteristics. The distribution zone 519 and distributor grid 518 provide the additional advantage of providing a low superficial velocity in a regeneration zone 504 as well as in the dense phase 515.

A catalyst feed conduit 509 preferably is in fluid communication with the dense phase 515 and directs an least partially coked catalyst, preferably in a fluidized manner, into the regeneration zone. The catalyst feed conduit 509 optionally is in fluid communication with one or more of the hydrocarbon conversion apparatus, a stripping unit, and/or a catalyst cooler, none of which are shown in FIG. 5A. As shown in FIG. 5A, catalyst feed conduit 509 extends through regeneration bottom partition 517, the distribution zone 519 and distributor grid 518. Alternatively, the catalyst feed conduit 509 extends through one or more obstructing members. Thus, the catalyst feed conduit 509 preferably releases the at least partially coked catalyst directly into the regeneration zone to form dense phase 515.

A catalyst return 510 also is provided in fluid communication with the regeneration zone. The catalyst return 510 directs the at least partially regenerated catalyst away from the regeneration zone of the catalyst regenerator 500 and, ultimately, back to the hydrocarbon conversion apparatus. As shown in FIG. 5A, catalyst return 510 extends through regenerator bottom partition 517, the distribution zone 519, and distributor grid 518. The catalyst return 510 preferably extends into dense phase 515, but below the dense phase surface 533, as shown. In another embodiment, not shown, the catalyst return 510 extends through one or more of the obstructing members. Optionally, the catalyst return 510 extends through the dense phase surface 533 and extends into separation zone 505. The distal end of catalyst return 510 optionally includes a fluted member 535, having a narrow proximal and a broad distal end which forms the catalyst outlet, as described above.

The total open surface area defined by the baffles in the dense phase 515 optionally is from about 20% to about 80%, preferably from about 40% to about 60%, and most preferably from about 45% to about 55% of the total lateral cross sectional area of the dense phase 515. Thus, the obstructing members preferably cover a portion of the total lateral cross sectional area of the fluidized bed, optionally from about 20 to about 80 percent, from about 40 to about 60 percent, or from about 45 to about 55 percent of the total lateral cross sectional area of the fluidized bed. Additionally or alternatively, the one or more primary obstructing members comprise at least one subway grate style baffle, which covers a portion of the total lateral cross sectional area of the fluidized bed. The subway grate style baffle optionally covers from about 60 to about 95 percent, from about 70 to about 95 percent or from about 80 to about 90 percent of the total lateral cross sectional area of the fluidized bed. The obstructing members themselves optionally comprise holes or other orifices extending therethrough to further break-up gas bubble size in the dense phase 515 that are formed due to the low finds content of the population of catalyst particles contained in the dense phase 515.

V. Oxygenate to Olefin Reaction Systems

In a preferred embodiment, the present invention relates to improving fluidization of catalyst particles having a low fines content in an oxygenate to olefins (OTO) reaction system or in a catalyst regeneration system associated with an OTO reaction system. Preferably the OTO reaction system comprises a methanol to olefins (MTO) reaction system, which is described in more detail below.

In an MTO reaction process, an oxygenate, e.g., methanol, contacts a catalyst in a HCA under conditions effective to convert at least a portion of the oxygenate to light olefins and at least partially deactivating the catalyst to form an at least partially deactivated catalyst, e.g., a coked catalyst. The at least partially deactivated catalyst is directed to a catalyst regenerator according to the present invention, wherein the at least partially deactivated catalyst is regenerated to form regenerated catalyst. At least a portion of the regenerated catalyst is directed to the reaction unit. The deactivated catalyst optionally contacts a stripping medium in a stripping unit under conditions effective to remove interstitial hydrocarbons from the deactivated catalyst.

The type of HCA that is implemented with the catalyst regenerator of the present invention will now be described in more detail. The reaction processes can take place in a variety of catalytic HCA's such as hybrid reactors that have dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and Fluidization Engineering, D. Kunii and O. Levenspiel, Robert E. Krieger Publishing Company, New York, N.Y. 1977, which are all herein fully incorporated by reference.

The preferred HCA type is selected from the riser reactors generally described in Riser Reactor, Fluidization and Fluid-Particle Systems, pages 48 to 59, F. A. Zenz and D. F. Othmer, Reinhold Publishing Corporation, New York, 1960, and U.S. Pat. No. 6,166,282 (fast-fluidized bed reactor), which are incorporated herein by reference. Most preferably, the HCA includes a plurality of riser reactors, as disclosed in U.S. patent application Ser. No. 09/564,613 filed May 4, 2000 to Lattner et al., the entirety of which is incorporated herein by reference.

Fresh feedstock, preferably containing one or more oxygenates, optionally with one or more diluents, is fed to the one or more riser reactors in a given reactor unit in which a zeolitic or non-zeolitic molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen or steam.

The feedstock entering an individual reactor system is preferably converted, partially or fully, in the first reactor zone into a gaseous effluent that enters the disengaging vessel along with a coked molecular sieve catalyst composition which is at least partially deactivated. In the preferred embodiment, cyclone(s) within the disengaging vessel are designed to separate the molecular sieve catalyst composition, preferably a coked molecular sieve catalyst composition, from the gaseous effluent containing one or more olefin (s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of a disengaging system in an individual HCA, the disengaging system includes a disengaging vessel. In one embodiment, a lower portion of the disengaging vessel is a stripping zone. In the stripping zone the at least partially coked molecular sieve catalyst composition is contacted with a stripping medium which is a gas, preferably one or a combination of steam, methane, carbon dioxide, carbon monoxide, hydrogen, or an inert gas such as argon, preferably steam, to recover adsorbed interstitial hydrocarbons from the at least partially coked molecular sieve catalyst composition that is then introduced to the regeneration system. Ideally, from about 2 to about 10, more preferably about 2 to about 6, and most preferably 3 to about 5 pounds of stripping medium, e.g., steam, is provided to the stripping unit for every 1000 pounds of catalyst. In another embodiment, the stripping zone is in a separate vessel from the disengaging vessel and the stripping medium is passed at a gas hourly superficial velocity (GHSV) of from 1 hr-1 to about 20,000 hr$^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

In one preferred embodiment of the process for converting an oxygenate to olefin(s) using a silicoaluminophosphate molecular sieve catalyst composition, the process is operated at a WHSV of at least 20 hr$^{-1}$ and a Temperature Corrected Normalized Methane Selectivity (TCNMS) of less than 0.016, preferably less than or equal to 0.01. See, for example, U.S. Pat. No. 5,952,538, which is herein fully incorporated by reference.

The optional multiple riser HCA's of the present invention are useful to conduct most any hydrocarbon conversion process in which a fluidized catalyst is employed. Typical reactions include, for example, olefin interconversion reactions, oxygenate to olefin conversion reactions (e.g., MTO reactions), oxygenate to gasoline conversion reactions, malaeic anhydride formulation, vapor phase methanol synthesis, phthalic anhydride formulation, Fischer Tropsch reactions, and acrylonitrile formulation.

The process for converting oxygenates to olefins employs a feed including an oxygenate. As used herein, the term "oxygenate" is defined to include, but is not necessarily limited to, hydrocarbons containing oxygen such as the following: aliphatic alcohols, ethers, carbonyl compounds (aldehydes, ketones, carboxylic acids, carbonates, and the like), and mixtures thereof. The aliphatic moiety desirably should contain in the range of from about 1-10 carbon atoms and more desirably in the range of from about 1-4 carbon atoms. Representative oxygenates include, but are not necessarily limited to, lower molecular weight straight chain or branched aliphatic alcohols, and their unsaturated counterparts. Examples of suitable oxygenates include, but are not necessarily limited to the following: methanol; ethanol; n-propanol; isopropanol; C4-C10 alcohols; methyl ethyl ether; dimethyl ether; diethyl ether; di-isopropyl ether; methyl formate; formaldehyde; di-methyl carbonate; methyl ethyl carbonate; acetone; and mixtures thereof. Desirably, the oxygenate used in the conversion reaction is selected from the group consisting of methanol, dimethyl ether and mixtures thereof. More desirably the oxygenate is methanol. The total charge of feed to the riser reactors may contain additional components, such as diluents.

One or more diluents may be fed to the riser reactors with the oxygenates, such that the total feed mixture comprises diluent in a range of from about 1 mol % and about 99 mol %. Diluents which may be employed in the process include, but are not necessarily limited to, helium, argon, nitrogen, carbon monoxide, carbon dioxide, hydrogen, water, paraffins, other hydrocarbons (such as methane), aromatic compounds, and mixtures thereof. Desired diluents include, but are not necessarily limited to, water and nitrogen.

A portion of the feed may be provided to the HCA in liquid form. When a portion of the feed is provided in a liquid form, the liquid portion of the feed may be either oxygenate, diluent or a mixture of both. The liquid portion of the feed may be directly injected into the individual riser reactors, or entrained or otherwise carried into the riser reactors with the vapor portion of the feed or a suitable carrier gas/diluent. By providing a portion of the feed (oxygenate and/or diluent) in the liquid phase, the temperature in the riser reactors can be controlled. The exothermic heat of reaction of oxygenate conversion is partially absorbed by the endothermic heat of vaporization of the liquid portion of the feed. Controlling the proportion of liquid feed to vapor feed fed to the reactor is one possible method for controlling the temperature in the reactor and in particular in the riser reactors.

A liquid feedstock optionally is fed separately or jointly with a vapor feedstock. The amount of feed provided in a liquid form, whether fed separately or jointly with the vapor feed, is from about 0.0 wt. % to about 85 wt. % of the total oxygenate content plus diluent in the feed. More desirably, the range is from about 1 wt. % to about 75 wt. % of the total oxygenate plus diluent feed, and most desirably the range is from about 5 wt. % to about 65 wt. %. The liquid and vapor portions of the feed may be the same composition, or may contain varying proportions of the same or different oxygenates and same or different diluents. One particularly effective liquid diluent is water, due to its relatively high heat of vaporization, which allows for a high impact on the reactor temperature differential with a relatively small rate. Other useful diluents are described above. Proper selection of the temperature and pressure of any appropriate oxygenate and/or diluent being fed to the reactor will ensure at least a portion is in the liquid phase as it enters the reactor and/or comes into contact with the catalyst or a vapor portion of the feed and/or diluent.

Optionally, the liquid fraction of the feed may be split into portions and introduced to riser reactors a multiplicity of locations along the length of the riser reactors. This may be done with either the oxygenate feed, the diluent or both. Typically, this is done with the diluent portion of the feed. Another option is to provide a nozzle which introduces the total liquid fraction of the feed to the riser reactors in a manner such that the nozzle forms liquid droplets of an appropriate size distribution which, when entrained with the gas and solids introduced to the riser reactors, vaporize gradually along the length of the riser reactors. Either of these arrangements or a combination thereof may be used to better control the temperature differential in the riser reactors. The means of introducing a multiplicity of liquid feed points in a reactor or designing a liquid feed nozzle to control droplet size distribution is well known in the art and is not discussed here.

The catalyst suitable for catalyzing an oxygenate-to-olefin conversion reaction includes a molecular sieve and mixtures of molecular sieves. Molecular sieves can be zeolitic (zeolites) or non-zeolitic (non-zeolites). Useful catalysts may also be formed from mixtures of zeolitic and non-zeolitic molecular sieves. Desirably, the catalyst includes a non-zeolitic molecular sieve. Desired molecular sieves for use with an oxygenate to olefins conversion reaction include "small" and "medium" pore molecular sieves. "Small pore" molecular sieves are defined as molecular sieves with pores having a diameter of less than about 5.0 Angstroms. "Medium pore" molecular sieves are defined as molecular sieves with pores having a diameter from about 5.0 to about 10.0 Angstroms.

Useful zeolitic molecular sieves include, but are not limited to, mordenite, chabazite, erionite, ZSM-5, ZSM-34, ZSM-48 and mixtures thereof. Methods of making these molecular sieves are known in the art and need not be discussed here. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof.

Silicoaluminophosphates ("SAPOs") are one group of non-zeolitic molecular sieves that are useful in an oxygenate to olefins conversion reaction. SAPOs comprise a three-dimensional microporous crystal framework structure of [$SiO_2$], [$AlO_2$] and [$PO_2$] tetrahedral units. The way Si is incorporated into the structure can be determined by 29Si MAS NMR. See Blackwell and Patton, J. Phys. Chem., 92, 3965 (1988). The desired SAPO molecular sieves will exhibit one or more peaks in the 29Si MAS NMR, with a chemical shift [(Si)] in the range of −88 to −96 ppm and with a combined peak area in that range of at least 20% of the total peak area of all peaks with a chemical shift [(Si)] in the range of −88 ppm to −115 ppm, where the [(Si)] chemical shifts refer to external tetramethylsilane (TMS).

It is desired that the silicoaluminophosphate molecular sieve used in such a process have a relatively low $Si/Al_2$ ratio. In general, the lower the $Si/Al_2$ ratio, the lower the C1-C4 saturates selectivity, particularly propane selectivity. A $Si/Al_2$ ratio of less than 0.65 is desirable, with a $Si/Al_2$ ratio of not greater than 0.40 being preferred, and a $SiAl_2$ ratio of not greater than 0.32 being particularly preferred.

Silicoaluminophosphate molecular sieves are generally classified as being microporous materials having 8, 10, or 12 membered ring structures. These ring structures can have an average pore size ranging from about 3.5-15 angstroms. Preferred are the small pore SAPO molecular sieves having an average pore size ranging from about 3.5 to 5 angstroms, more preferably from 4.0 to 5.0 angstroms. These pore sizes are typical of molecular sieves having 8 membered rings.

In general, silicoaluminophosphate molecular sieves comprise a molecular framework of corner-sharing [$SiO_2$], [$AlO_2$], and [$PO_2$] tetrahedral units. This type of framework is effective in converting various oxygenates into olefin products.

Suitable silicoaluminophosphate molecular sieves for use in an oxygenate to olefin conversion process include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, is SAPO-42, SAPO-44, SAPO-47, SAPO-56, the metal containing forms thereof, and mixtures thereof. Thus, at least partially coked catalyst regenerated by the catalyst regenerator optionally contains molecular sieve particles selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal containing forms thereof, intergrown forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

Preferably, the at least partially coked catalyst that is fed to the catalyst regenerator has a $d_{50}$ particle size from about 20 to about 200 microns. The $d_x$ particle size means that x percent by volume of the formulated catalyst composition particles have a particle diameter no greater than the $d_x$ value. For the purposes of this definition, the particle size distribution (PSD) used to define the $d_x$ value is measured using well known laser scattering techniques using a Microtrac Model 3000 particle size analyzer from Microtrac, Inc. (Clearwater, Fla.). "Particle diameter" as used herein means the diameter of a specified spherical particle or the equivalent diameter of non-spherical particles as measured by laser scattering using a Microtrac Model 3000 particles size analyzer.

Additional olefin-forming molecular sieve materials can be mixed with the silicoaluminophosphate catalyst if desired. Several types of molecular sieves exist, each of which exhibit different properties. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof. Structural types of medium pore molecular sieves that are suitable for use in this invention include MFI, MEL, MTW, EUO, MTT, HEU, FER, AFO, AEL, TON, and substituted forms thereof. Preferred molecular sieves which can be combined with a silicoaluminophosphate catalyst include ZSM-5, ZSM-34, erionite, and chabazite.

Substituted SAPOs form a class of molecular sieves known as "MeAPSOs," which are also useful in the present invention. Processes for making MeAPSOs are known in the art. SAPOs with substituents, such as MeAPSOs, also may be suitable for use in the present invention. Suitable substituents, "Me," include, but are not necessarily limited to, nickel, cobalt, manganese, zinc, titanium, strontium, magnesium, barium, and calcium. The substituents may be incorporated during synthesis of the MeAPSOs. Alternately, the substituents may be incorporated after synthesis of SAPOs or MeAPSOs using many methods. These methods include, but are not necessarily limited to, ion-exchange, incipient wetness, dry mixing, wet mixing, mechanical mixing, and combinations thereof.

Desired MeAPSOs are small pore MeAPSOs having pore size smaller than about 5 Angstroms. Small pore MeAPSOs include, but are not necessarily limited to, NiSAPO-34, CoSAPO-34, NiSAPO-17, CoSAPO-17, and mixtures thereof.

Aluminophosphates (ALPOs) with substituents, also known as "MeAPOs," are another group of molecular sieves that may be suitable for use in an oxygenate to olefin conversion reaction, with desired MeAPOs being small pore MeAPOs. Processes for making MeAPOs are known in the art. Suitable substituents include, but are not necessarily limited to, nickel, cobalt, manganese, zinc, titanium, strontium, magnesium, barium, and calcium. The substituents may be incorporated during synthesis of the MeAPOs. Alternately, the substituents may be incorporated after synthesis of ALPOs or MeAPOs using many methods. The methods include, but are not necessarily limited to, ion-exchange, incipient wetness, dry mixing, wet mixing, mechanical mixing, and combinations thereof.

The molecular sieve may also be incorporated into a solid composition, preferably solid particles, in which the molecular sieve is present in an amount effective to catalyze the desired conversion reaction. The solid particles may include a catalytically effective amount of the molecular sieve and matrix material, preferably at least one of a filler material and a binder material, to provide a desired property or properties, e.g., desired catalyst dilution, mechanical strength and the like, to the solid composition. Such matrix materials are often to some extent porous in nature and often have some nonselective catalytic activity to promote the formation of undesired products and may or may not be effective to promote the desired chemical conversion. Such matrix, e.g., filler and binder, materials include, for example, synthetic and naturally occurring substances, metal oxides, clays, silicas, aluminas, silica-aluminas, silica-magnesias, silica-zirconias, silica-thorias, silica-beryllias, silica-titanias, silica-alumina-thorias, silica-aluminazirconias, and mixtures of these materials.

The solid catalyst composition preferably comprises about 1% to about 99%, more preferably about 5% to about 90%, and still more preferably about 10% to about 80%, by weight of molecular sieve; and an amount of about 1% to about 99%, more preferably about 5% to about 90%, and still more preferably about 10% to about 80%, by weight of matrix material.

The preparation of solid catalyst compositions, e.g., solid particles, comprising the molecular sieve and matrix material, is conventional and well known in the art and, therefore, is not discussed in detail here.

The catalyst may further contain binders, fillers, or other material to provide better catalytic performance, attrition resistance, regenerability, and other desired properties. Desirably, the catalyst is fluidizable under the reaction conditions. The catalyst should have particle sizes of from about 5µ to about 3,000µ, desirably from about 10µ to about 200µ, and more desirably from about 20µ to about 150µ. The catalyst may be subjected to a variety of treatments to achieve the desired physical and chemical characteristics. Such treatments include, but are not necessarily limited to, calcination, ball milling, milling, grinding, spray drying, hydrothermal treatment, acid treatment, base treatment, and combinations thereof.

Desirably, in an oxygenate to olefin conversion reaction conducted in one or more HCA's employs a gas superficial velocity in the riser reactors of greater than 1 meter per second (m/s). As used herein and in the claims, the term, "gas superficial velocity," is defined as the volumetric flow rate of vaporized feedstock, and any diluent, divided by the open reactor cross-sectional area. Because the oxygenate is converted to a product including a light olefin while flowing through the reactor, the gas superficial velocity may vary at different locations within the reactor depending on the total number of moles of gas present and the cross section of a particular location in the reactor, temperature, pressure, and other relevant reaction parameters. The gas superficial velocity, including any diluents present in the feedstock, is maintained at a rate greater than 1 meter per second (m/s) at any point in the reactor. Desirably, the gas superficial velocity is greater than about 2 m/s. More desirably, the gas superficial velocity is greater than about 2.5 m/s. Even more desirably, the gas superficial velocity is greater than about 4 m/s. Most desirably, the gas superficial velocity is greater than about 8 m/s.

Maintaining the gas superficial velocity at these rates increases the approach to plug flow behavior of the gases flowing in the riser reactors. As the gas superficial velocity increases above 1 m/s, a reduction in axial diffusion or back mixing of the gases results from a reduction in internal recirculation of solids, which carry gas with them. (Ideal plug flow behavior occurs when elements of the homogeneous fluid reactant move through a reactor as plugs moving parallel to the reactor axis). Minimizing the back mixing of the gases in the reactor increases the selectivity to the desired light olefins in the oxygenate conversion reaction.

When the gas superficial velocity approaches 1 m/s or higher, a substantial portion of the catalyst in the reactor may be entrained with the gas exiting the riser reactors. At least a portion of the catalyst exiting the riser reactors is recirculated to recontact the feed through the catalyst return.

Desirably, the rate of catalyst, comprising molecular sieve and any other materials such as binders, fillers, etc., recirculated to recontact the feed is from about 1 to about 100 times, more desirably from about 10 to about 80 times, and most desirably from about 10 to about 50 times the total feed rate, by weight, of oxygenates to the reactor.

The temperature useful to convert oxygenates to light olefins varies over a wide range depending, at least in part, on the catalyst, the fraction of regenerated catalyst in a catalyst mixture, and the configuration of the reactor apparatus and the reactor. Although these processes are not limited to a particular temperature, best results are obtained if the process is conducted at a temperature from about 200° C. to about 1000° C., more preferably from about 200° C. to about 700° C., desirably from about 250° C. to about 600° C., and most desirably from about 300° C. to about 550° C. Lower temperatures generally result in lower rates of reaction, and the formation rate of the desired light olefin products may become markedly slower. However, at temperatures greater than 700° C., the process may not form an optimum amount of light olefin products, and the rate at which coke and light saturates form on the catalyst may become too high.

Light olefins will form—although not necessarily in optimum amounts—at a wide range of pressures including, but not limited to, pressures from about 0.1 kPa to about 5 MPa. A desired pressure is from about 5 kPa to about 1 MPa and most desirably from about 20 kPa to about 500 kPa. The foregoing pressures do not include that of a diluent, if any, and refer to the partial pressure of the feed as it relates to oxygenate compounds and/or mixtures thereof. Pressures outside of the stated ranges may be used and are not excluded from the scope of the invention. Lower and upper extremes of pressure may adversely affect selectivity, conversion, coking rate, and/or reaction rate; however, light olefins will still form and, for that reason, these extremes of pressure are considered part of the present invention.

A wide range of WHSV's for the oxygenate conversion reaction, defined as weight of total oxygenate fed to the riser reactors per hour per weight of molecular sieve in the catalyst in the riser reactors, function with the present invention. The total oxygenate fed to the riser reactors includes all oxygenate in both the vapor and liquid phase. Although the catalyst may contain other materials which act as inerts, fillers or binders, the WHSV is calculated using only the weight of molecular sieve in the catalyst in the riser reactors. The WHSV is desirably high enough to maintain the catalyst in a fluidized state under the reaction conditions and within the reactor configuration and design. Generally, the WHSV is from about 1 hr-1 to about 5000 hr-1, desirably from about 2 hr-1 to about 3000 hr-1, and most desirably from about 5 hr-1 to about 1500 hr-1. The applicants have discovered that operation of the oxygenate to olefin conversion reaction at a WHSV greater than 20 hr-1 reduces the methane content in the product slate of the conversion reaction. Thus, the conversion reaction is desirably operated at a WHSV of at least about 20 hr-1. For a feed comprising methanol, dimethyl ether, or mixtures thereof, the WHSV is desirably at least about 20 hr-1 and more desirably from about 20 hr-1 to about 300 hr-1.

The method of making the preferred olefin product in this invention can include the additional step of making the oxygenate compositions from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are preferred. Particularly preferred are metallocene, Ziegler/Natta and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is between 50° C. and 240° C. and the reaction can be carried out at low, medium or high pressure, being anywhere from 1 bar to 200 bars. For processes carried out in solution, an inert diluent can be used, and the preferred operating pressure range is between 10 and 150 bars, with a preferred temperature between 120° C. and 230° C. For gas phase processes, it is preferred that the temperature generally be from 60° C. to 160° C., and that the operating pressure be from 5 bars to 50 bars.

In addition to polyolefins, numerous other olefin derivatives may be formed from the olefins produced by the process of the present invention or olefins recovered therefrom. These include, but are not limited to, aldehydes, alcohols, acetic acid, linear alpha olefins, vinyl acetate, ethylene dichloride and vinyl chloride, ethylbenzene, ethylene oxide, ethylene glycol, cumene, isopropyl alcohol, acrolein, allyl chloride, propylene oxide, acrylic acid, ethylene-propylene rubbers, and acrylonitrile, and trimers and dimers of ethylene, propylene or butylenes. The methods of manufacturing these derivatives are well known in the art, and therefore are not discussed here.

VI. Examples

The present invention will be better understood in view of the following non-limiting examples.

Examples 1 and 2

In Examples 1 and 2, a population of catalyst particles having a low fines content was fluidized in a fluidized bed reactor at a vessel velocity of 0.15 ft/s. The fluidized bed reactor was generally of the form illustrated in FIG. 4, but implemented a sparger and external separation devices. Example 1 included 2 subway grate obstructing members of the type shown in FIG. 4 in the dense phase, and Example 2 included 1 subway grate obstructing member of the type shown in FIG. 4 in the dense phase. The specific particle size distributions for Examples 1 and 2 were as follows:

TABLE I

Low Fines Content PSD

| Particle Size (Microns) | Examples 1 & 2 (wt %) |
|---|---|
| <20 | ~0.4 |
| 20-45 | ~1.2 |
| 45-75 | ~42.6 |
| 75-120 | ~46.6 |
| 120-200 | ~8.8 |

Figure 6:
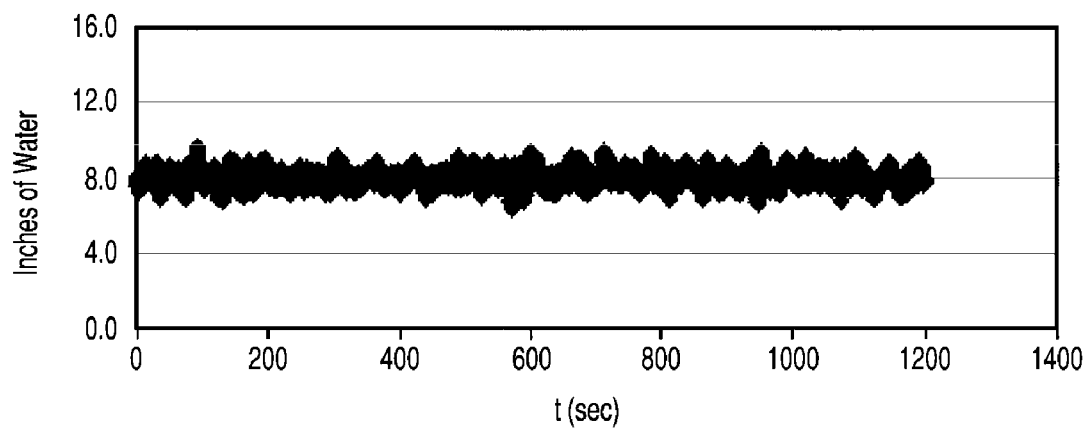
FIG. 6 presents a graph plotting dynamic bed pressure drop measurements at low fines content as a function of time for a fluidized bed reactor having 2 notched grated baffles.

In these examples, dynamic bed pressure drop measurements were taken over a period of time of 0-1200 seconds. The results of Example 1, shown in FIG. 6, show that the pressure oscillations in the fluidized bed were on the order of +/−1 inch of water when two baffles are implemented. This data represents generally good fluidization as lower pressure oscillations generally correspond with better fluidization (less bubble bursting), notwithstanding the low fines content. A fluidization density of 42 lb/ft$^3$ was achieved.

Figure 7:
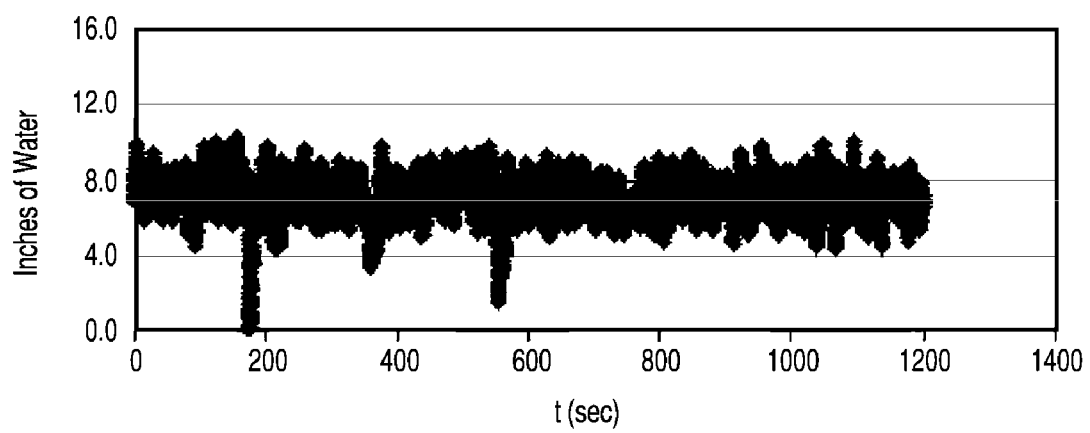
FIG. 7 presents a graph plotting dynamic bed pressure drop measurements at low fines content as a function of time for a fluidized bed reactor having 1 notched grated baffle.

The results of Example 2, shown in FIG. 7, show that the pressure oscillations in the fluidized bed were on the order of +/−2-3 inches of water when one baffle was implemented, reflecting generally poorer fluidization. The fluidization density was 42 lb/ft$^3$.

Example 3

In Example 3, a population of catalyst particles having a low fines content was fluidized in a fluidized bed reactor at a vessel velocity of 0.5 ft/s. The fluidized bed reactor was generally of the form illustrated in FIG. 5 having 6 layers of inverted "V" shaped, shed type obstructing members, but implementing a sparger and external separation devices. The specific particle size distribution was as shown in Table I, above.

Figure 8:
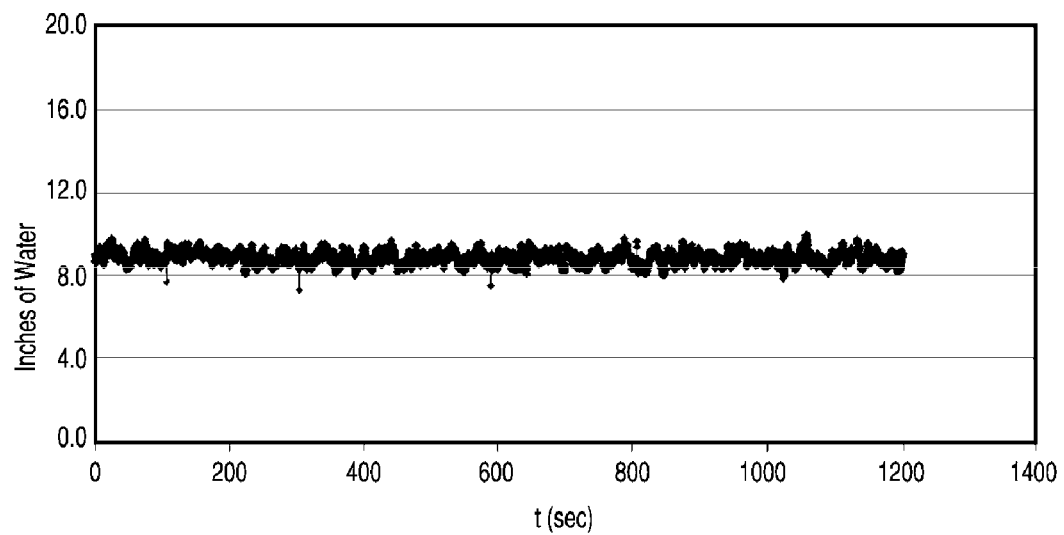
FIG. 8 presents a graph plotting dynamic bed pressure drop measurements at low fines content as a function of time for a fluidized bed reactor having inverted "v" shed baffles, as shown in FIG. 5.

In this example, dynamic bed pressure drop measurements were taken over a period of time of 0-1200 seconds. The results of Example 3, shown in FIG. 8, show that the pressure oscillations in the fluidized bed were on the order of +/−0.5 to 1.0 inch of water. This represents particularly good fluidization notwithstanding the low fines content.

Example 4

Example 4 is a comparative example in which a population of catalyst particles having a low fines content was fluidized in a fluidized bed reactor at a vessel velocity of 0.15 ft/s. The fluidized bed reactor did not contain any obstructing members. The specific particle size distribution was as shown in Table I, above.

Figure 9:
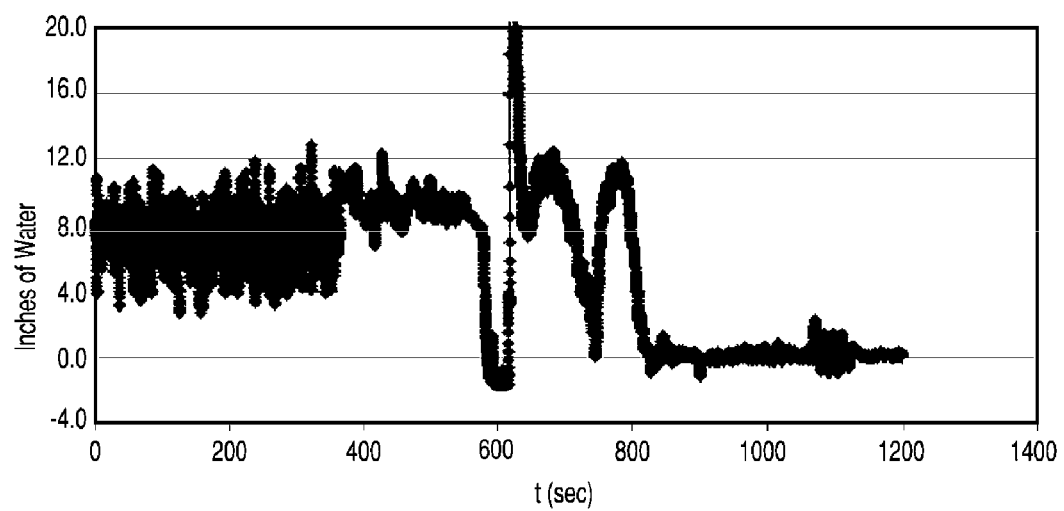
FIG. 9 presents a graph plotting dynamic bed pressure drop measurements at low fines content as a function of time for a fluidized bed reactor without any baffles.

In this example, dynamic bed pressure drop measurements were taken over a period of time of 0-1200 seconds. The results of Example 4, shown in FIG. 9, show that the pressure oscillations in the fluidized bed were on the order of +/−4.0 to 5.0 inches of water. This represents very poor fluidization due to the low fines content.

Example 5

Example 5 is another comparative example in which a population of catalyst particles having a fines content of about 8-12 wt. percent was fluidized in a fluidized bed reactor at a vessel velocity of 0.07 ft/s. The fluidized bed reactor did not contain any obstructing members.

Figure 10:
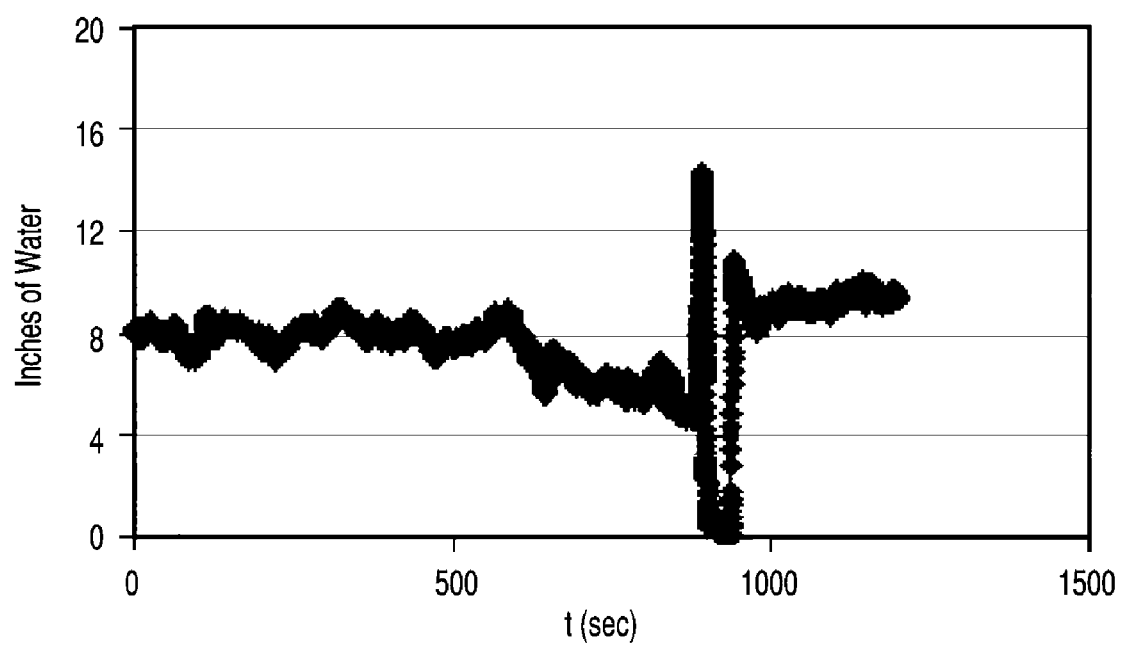
FIG. 10 presents a graph plotting dynamic bed pressure drop measurements at adequate fines content (8-12 wt. %) as a function of time for a fluidized bed reactor without any baffles.

In this example, dynamic bed pressure drop measurements were taken over a period of time of 0-1200 seconds. The results of Example 5, shown in FIG. 10, show that the pressure oscillations in the fluidized bed were on the order of +/−0.5 to 1.0 inch of water. This represents particularly good fluidization due to the presence of fines.

Persons of ordinary skill in the art will recognize that many modifications may be made to the present invention without departing from the spirit and scope of the present invention. The embodiments described herein are meant to be illustrative only and should not be taken as limiting the invention, which is defined by the following claims.

The invention claimed is:

1. A reaction system, comprising:
   (a) a fluidized bed of a plurality of catalyst particles in a reactor, wherein the catalyst particles have a $d_2$ value of greater than about 40 microns, wherein the reactor comprises continuous reaction and separation zones, and a fluidized bed of the catalyst particles situated within the reaction zone; and
   (b) one or more primary obstructing members situated within the fluidized bed for at least partially obstructing the upward flow of the catalyst particles, and one or more secondary obstructing members situated within the separation zone for at least partially obstructing the upward flow of entrained catalyst.

2. The reaction system of claim 1, wherein the $d_2$ value is greater than about 50 microns.

3. The reaction system of claim 1, wherein the $d_2$ value is greater than about 60 microns.

4. The reaction system of claim 1, wherein one or more secondary obstructing members are situated less than 2 meters above the fluidized bed.

5. The reaction system of claim 1, wherein the reactor comprises a catalyst regenerator.

6. The reaction system of claim 1, wherein the catalyst particles comprise molecular sieves selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AEI/CHA intergrowths, the metal containing forms thereof, and mixtures thereof.

7. The reaction system of claim 1, wherein the catalyst particles contact a feedstock comprising an oxygenate in the fluidized bed under conditions effective to convert the oxygenate to light olefins and water.

8. The reaction system of claim 7, wherein the catalyst particles are fluidized with a fluidizing medium comprising the feedstock.

9. The reaction system of claim 1, wherein at least a portion of the plurality of catalyst particles are at least partially coked.

10. The reaction system of claim 9, wherein the catalyst particles contact a regeneration medium in the fluidized bed under conditions effective to at least partially regenerate the at least partially coked catalyst particles.

11. The reaction system of claim 9, wherein the regeneration medium comprises air.

12. The reaction system of claim 9, wherein the catalyst particles are fluidized with a fluidizing medium comprising the regeneration medium.

13. The reaction system of claim 1, wherein catalyst particles have an axial gas Peclet number ranging from about 4 to about 100.

14. The reaction system of claim 13, wherein the Peclet number ranges from about 8 to about 30.

15. The reaction system of claim 13, wherein the Peclet number ranges from about 10 to about 20.

16. The reaction system of claim 1, wherein the one or more primary obstructing members comprise at least one inverted "V" shaped baffle, which covers a portion of the total lateral cross sectional area of the fluidized bed.

17. The reaction system of claim 16, wherein the inverted "V" shaped baffle covers from about 20 to about 80 percent of the total lateral cross sectional area of the fluidized bed.

18. The reaction system of claim 16, wherein the inverted "V" shaped baffle covers from about 45 to about 55 percent of the total lateral cross sectional area of the fluidized bed.

19. The reaction system of claim 1, wherein the one or more primary obstructing members comprise at least one subway grate style baffle, which covers a portion of the total lateral cross sectional area of the fluidized bed.

20. The reaction system of claim 19, wherein the subway grate style baffle covers from about 60 to about 95 percent of the total lateral cross sectional area of the fluidized bed.

21. The reaction system of claim 19, wherein the subway grate style baffle covers from about 70 to about 95 percent of the total lateral cross sectional area of the fluidized bed.

* * * * *